US012119164B2

(12) United States Patent
Nakamura et al.

(10) Patent No.: US 12,119,164 B2
(45) Date of Patent: Oct. 15, 2024

(54) COIL COMPONENT AND METHOD FOR MANUFACTURING COIL COMPONENT

(71) Applicant: Murata Manufacturing Co., Ltd., Kyoto-fu (JP)

(72) Inventors: Masayoshi Nakamura, Nagaokakyo (JP); Yuki Kanbe, Nagaokakyo (JP); Akio Miyazaki, Nagaokakyo (JP); Kazuhiko Chiba, Nagaokakyo (JP)

(73) Assignee: Murata Manufacturing Co., Ltd., Kyoto-fu (JP)

( * ) Notice: Subject to any disclaimer, the term of this patent is extended or adjusted under 35 U.S.C. 154(b) by 580 days.

(21) Appl. No.: 17/378,335

(22) Filed: Jul. 16, 2021

(65) Prior Publication Data

US 2022/0037081 A1 Feb. 3, 2022

(30) Foreign Application Priority Data

Jul. 31, 2020 (JP) ................................ 2020-130354

(51) Int. Cl.
*H01F 27/29* (2006.01)
*H01F 27/24* (2006.01)
(Continued)

(52) U.S. Cl.
CPC ............. *H01F 27/29* (2013.01); *H01F 27/24* (2013.01); *H01F 27/2823* (2013.01); *H01F 41/0206* (2013.01); *H01F 41/04* (2013.01)

(58) Field of Classification Search
CPC ...... H01F 27/29; H01F 27/24; H01F 27/2823; H01F 3/10; H01F 27/292;
(Continued)

(56) References Cited

U.S. PATENT DOCUMENTS

| | | | | |
|---|---|---|---|---|
| 6,480,083 B1 * | 11/2002 | Toi | H01F 27/292 | 336/200 |
| 7,212,093 B2 * | 5/2007 | Singu | H01F 17/045 | 336/83 |

(Continued)

FOREIGN PATENT DOCUMENTS

| | | |
|---|---|---|
| CN | 1286480 A | 3/2001 |
| CN | 110676032 A | 1/2020 |

(Continued)

*Primary Examiner* — Mang Tin Bik Lian

(74) *Attorney, Agent, or Firm* — Studebaker & Brackett PC

(57) ABSTRACT

A coil component includes a drum-shaped core including a core portion that extends in a length direction of the coil component and a first flange portion provided on a first end portion of the core portion, and first and second terminal electrodes provided on the first flange portion. The first and second terminal electrodes each include a base electrode formed on a surface of the first flange portion and a plating layer that covers the base electrode. The base electrode includes a bottom-surface base electrode portion on a bottom surface, an end-surface base electrode portion on an end surface, and a side-surface base electrode portion on a first side surface. The end-surface base electrode portion has a height greater than that of the first crotch portion. The side-surface base electrode portion has a height less than that of the first crotch portion.

22 Claims, 10 Drawing Sheets

(51) Int. Cl.
*H01F 27/28* (2006.01)
*H01F 41/02* (2006.01)
*H01F 41/04* (2006.01)

(58) Field of Classification Search
CPC .......... H01F 2017/0093; H01F 17/045; H01F 27/06; H01F 2027/065
See application file for complete search history.

(56) References Cited

U.S. PATENT DOCUMENTS

| | | | | |
|---|---|---|---|---|
| 2001/0038327 | A1* | 11/2001 | Aoki | H01F 27/027 336/83 |
| 2005/0052267 | A1* | 3/2005 | Singu | H01F 27/292 336/83 |
| 2016/0118183 | A1* | 4/2016 | Wada | H01F 27/292 336/192 |
| 2016/0240305 | A1* | 8/2016 | Igarashi | H01F 27/292 |
| 2016/0365191 | A1* | 12/2016 | Horie | H01F 27/2823 |
| 2017/0287634 | A1* | 10/2017 | Baba | H01F 17/045 |
| 2018/0342346 | A1* | 11/2018 | Hashimoto | H01F 27/292 |
| 2019/0080835 | A1* | 3/2019 | Shibuya | H01F 27/2823 |
| 2019/0089320 | A1* | 3/2019 | Kobayashi | H01F 17/045 |
| 2019/0148055 | A1* | 5/2019 | Moriya | H01F 27/292 336/83 |

FOREIGN PATENT DOCUMENTS

| | | | |
|---|---|---|---|
| JP | 2016-054262 | A | 4/2016 |
| JP | 2018-186158 | A | 11/2018 |
| JP | 2020-004924 | A | 1/2020 |
| JP | 6633829 | B2 | 1/2020 |
| JP | 2020-057637 | A | 4/2020 |

* cited by examiner

COIL COMPONENT AND METHOD FOR MANUFACTURING COIL COMPONENT

CROSS-REFERENCE TO RELATED APPLICATION

This application claims benefit of priority to Japanese Patent Application No. 2020-130354, filed Jul. 31, 2020, the entire content of which is incorporated herein by reference.

BACKGROUND

Technical Field

The present disclosure relates to a coil component and a method for manufacturing a coil component.

Background Art

A wire-wound coil component is an example of a coil component of the related art. The wire-wound coil component includes a drum-shaped core including a core portion that extends in an axial direction and flange portions provided at both ends of the core portion; terminal electrodes provided on the flange portions; and a plurality of wires connected to the terminal electrodes and wound around the core portion (see, for example, Japanese Unexamined Patent Application Publication No. 2020-57637). Each terminal electrode includes, for example, a base electrode formed on a surface of a corresponding one of the flange portions by a dip method and a plating electrode that covers the base electrode. Each flange portion includes a crotch portion having the shape of a groove that extends from a lower surface of the flange portion on which the terminal electrodes are formed toward an upper surface that is opposite to the lower surface. The crotch portion ensures insulation between the terminal electrodes formed on edge portions.

The above-described coil component is mounted on a circuit board by solder. The coil component in the mounted state is inspected by using, for example, an appearance inspection apparatus (for example, an automated optical inspection (AOI) apparatus). The appearance inspection apparatus recognizes solder fillets formed between the circuit board and the terminal electrodes to inspect the coil component in the mounted state. To facilitate the recognition of the fillets, the fillets preferably have a large height. In other words, the terminal electrodes preferably have a large height. However, when terminal electrodes having a greater height is formed by the dip method, there is a risk that the terminal electrodes will be electrically connected to each other.

SUMMARY

Accordingly, the present disclosure provides a coil component on which highly recognizable fillets may be formed and a method for manufacturing the coil component.

According to preferred embodiments of the present disclosure, a coil component includes a drum-shaped core including a core portion that extends in a length direction of the coil component and a first flange portion provided on a first end portion of the core portion in the length direction; a first wire and a second wire which each have a first end and a second end, the first wire and the second wire being wound around the core portion; a first terminal electrode that is provided on the first flange portion and to which the first end of the first wire is connected; and a second terminal electrode that is provided on the first flange portion and to which the first end of the second wire is connected. The first flange portion includes an inner surface that faces toward the core portion, an end surface that faces away from the inner surface, a bottom surface and a top surface that face away from each other in a height direction that is orthogonal to the length direction, and a pair of side surfaces that face away from each other in a width direction that is orthogonal to the length direction and the height direction. The first flange portion includes a first main portion provided on the first end portion of the core portion, a first leg portion and a second leg portion that project from the first main portion in the height direction, a main-portion bottom surface of the first main portion that faces toward the bottom surface, and a pair of inside surfaces of the first leg portion and the second leg portion that face each other. The first main portion, the first leg portion, and the second leg portion surround and define a first crotch portion when viewed from the end surface. The bottom surface includes a first bottom surface of the first leg portion and a second bottom surface of the second leg portion. The first terminal electrode and the second terminal electrode each include a base electrode formed on a surface of the first flange portion and a plating layer that covers the base electrode. The base electrode includes a bottom-surface base electrode portion formed on the bottom surface, an end-surface base electrode portion formed on the end surface, and a side-surface base electrode portion formed on each of the side surfaces. The end-surface base electrode portion has a height greater than a height of the first crotch portion. The side-surface base electrode portion has a height less than the height of the first crotch portion.

According to the above-described structure, the first terminal electrode and the second terminal electrode, which each include the base electrode and the plating layer that covers the base electrode, have a height greater than the crotch height on the end surface of the first flange portion. Therefore, when the coil component is mounted, solder that adheres to the first terminal electrode and the second terminal electrode on the end surface forms fillets that are more easily recognizable than those on other coil components having crotch portions of the same height. Thus, recognition of the fillets by an appearance inspection apparatus is facilitated.

According a method for manufacturing a coil component of preferred embodiments of the present disclosure, the coil component includes a drum-shaped core including a core portion that extends in a length direction of the coil component, a first flange portion provided on a first end portion of the core portion in the length direction, and a second flange portion provided on a second end portion of the core portion in the length direction, a first terminal electrode and a second terminal electrode provided on the first flange portion, and a third terminal electrode and a fourth terminal electrode provided on the second flange portion. The first to fourth terminal electrodes each include a base electrode formed on a surface of the drum-shaped core and a plating layer that covers the base electrode. The first flange portion includes a first main portion provided on the first end portion of the core portion, a first leg portion, and a second leg portion, the first leg portion and the second leg portion projecting from the first main portion in a height direction that is orthogonal to the length direction. The first flange portion has a first crotch portion surrounded by the first main portion, the first leg portion, and the second leg portion. The second flange portion includes a second main portion provided on the second end portion of the core portion, a third leg portion, and a fourth leg portion, the third leg portion and the fourth leg portion projecting from the second main portion in the height direction. The second flange portion has a second crotch portion surrounded by the second main portion, the third leg portion, and the fourth leg portion. The method includes a first step of holding the drum-shaped core such that a bottom surface of the drum-shaped core faces conductive paste used to form the base electrode, and moving the drum-shaped core downward toward an upper surface of a surface plate on which the conductive paste is provided, thereby dipping a portion of the drum-shaped core into the conductive paste; a second step of moving the drum-shaped core in a direction along the length direction by a first distance; a third step of moving the drum-shaped core in a direction opposite to the direction of movement in the second step by a distance that is twice the first distance; a fourth step of moving the drum-shaped core in the direction of movement in the second step by the first distance; and a fifth step of moving the drum-shaped core upward away from the conductive paste.

According to the above-described method, the height of the base electrode on end surfaces of the drum-shaped core can be easily increased to a height greater than the crotch height by moving the drum-shaped core back and forth in the length direction of the drum-shaped core.

The embodiments of the present disclosure provide a coil component on which highly recognizable fillets may be formed.

Other features, elements, characteristics and advantages of the present disclosure will become more apparent from the following detailed description of preferred embodiments of the present disclosure with reference to the attached drawings.

DETAILED DESCRIPTION

An embodiment will now be described.

In the accompanying drawings, components may be enlarged to facilitate understanding. Dimensional ratios between the components may differ from the actual ones or from those in other diagrams. In sectional views, cross-hatching of some of the components may be omitted to facilitate understanding.

Figure 1:
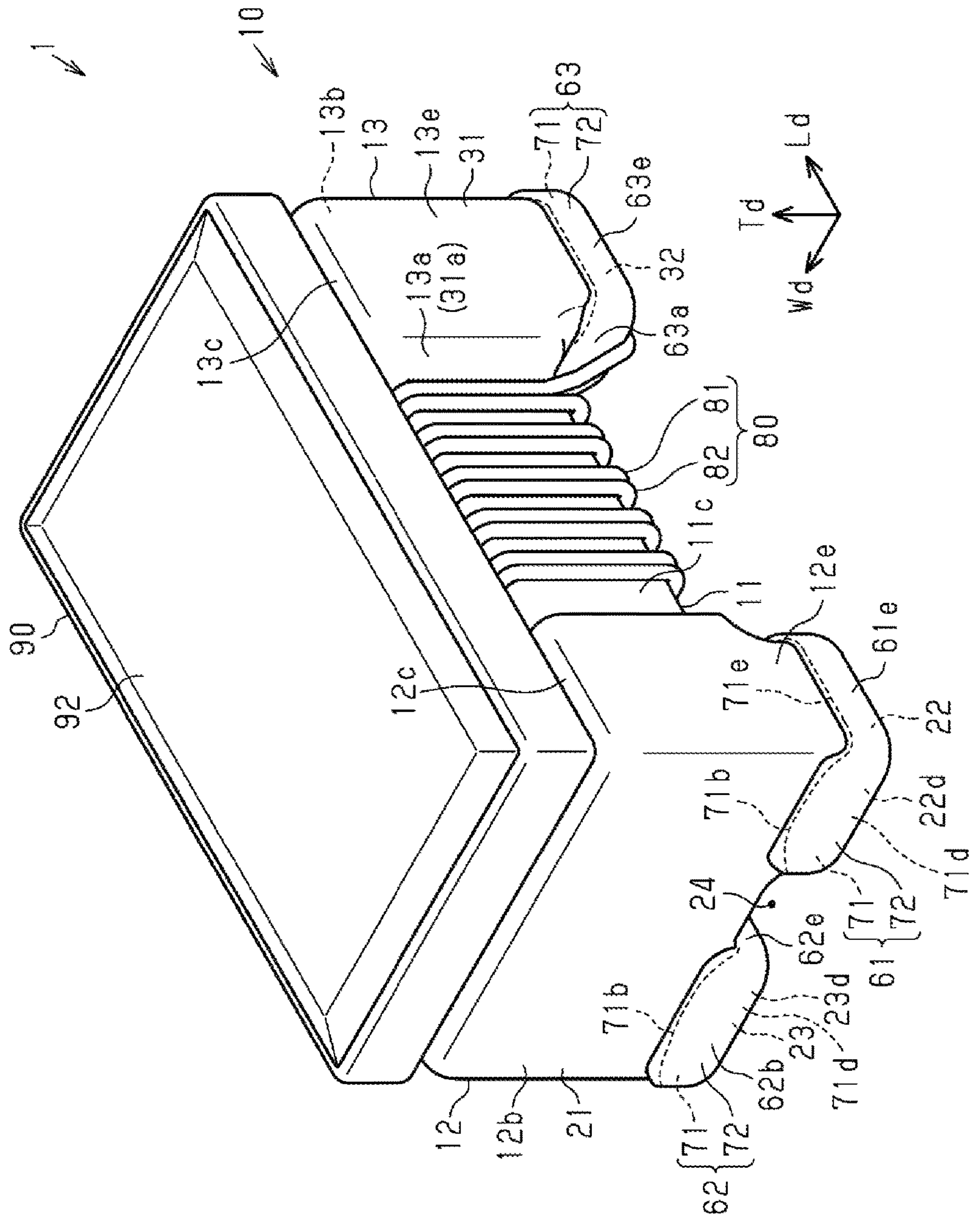
FIG. 1 is an upper perspective view of a coil component according to an embodiment.
Figure 2:
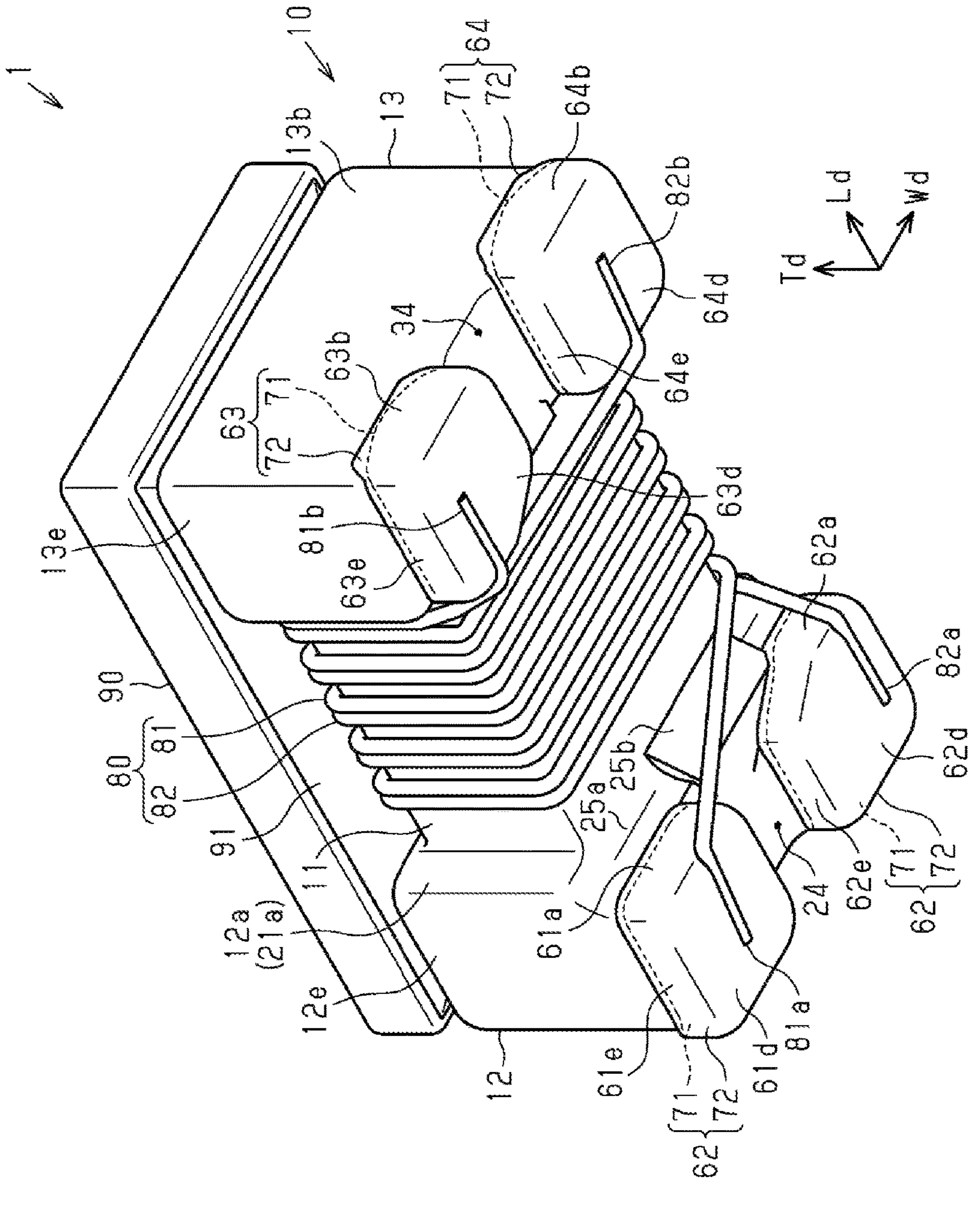
FIG. 2 is a lower perspective view of the coil component according to the embodiment.

As illustrated in FIGS. 1 and 2, a coil component 1 includes a drum-shaped core 10 and a coil 80 wound around the drum-shaped core 10. The coil component 1 is, for example, a surface-mount coil component. The coil component 1 according to the present embodiment is, for example, a common-mode choke coil.

Drum-Shaped Core

The drum-shaped core 10 is made of a non-conductive material, more specifically, a non-magnetic material, such as alumina, or a magnetic material, such as nickel-zinc (Ni—Zn)-based ferrite. The drum-shaped core 10 is formed by, for example, firing a compact obtained by compressing a non-conductive material. The drum-shaped core 10 is not limited to those formed by firing a compact obtained by compressing a non-conductive material, and may instead be formed by, for example, heat-curing a resin containing magnetic powder, such as metal powder or ferrite powder, a resin containing non-magnetic powder, such as silica powder, or a resin containing no fillers.

Figure 3:
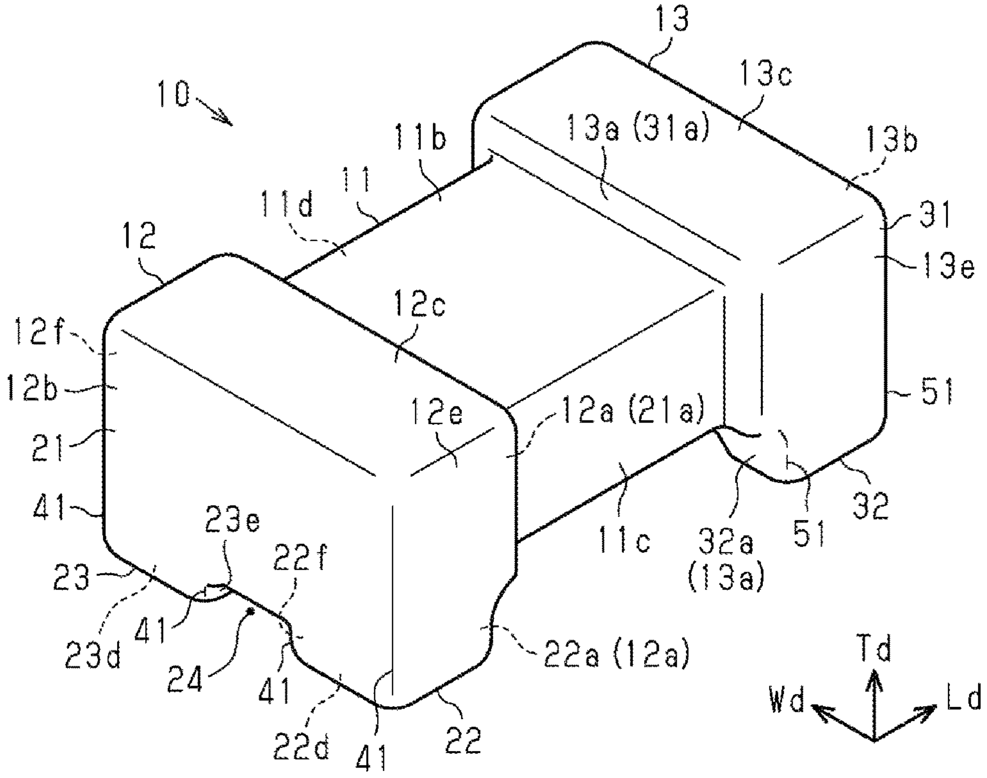
FIG. 3 is an upper perspective view of a drum-shaped core.
Figure 4:
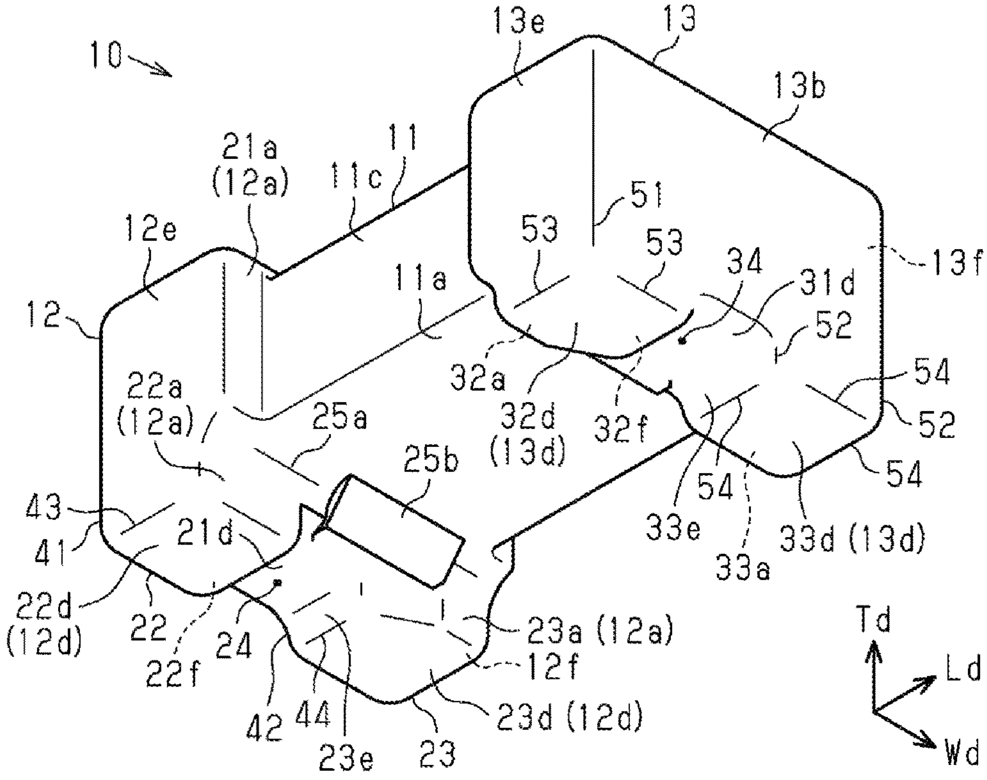
FIG. 4 is a lower perspective view of the drum-shaped core.

As illustrated in FIGS. 3 and 4, the drum-shaped core 10 includes a core portion 11 that extends in a length direction Ld of the coil component 1, a first flange portion 12 provided on a first end portion of the core portion 11 in the length direction Ld, and a second flange portion 13 provided on a second end portion of the core portion 11 in the length direction Ld. In the present embodiment, the core portion 11, the first flange portion 12, and the second flange portion 13 are formed integrally with each other. In this specification, the length direction Ld may be read as an arrangement direction in which the first flange portion 12 and the second flange portion 13 are arranged. In addition, in this specification, a “height direction Td” and a “width direction Wd” of the coil component 1 are given as follows. That is, the height direction Td is one of directions perpendicular to the length direction Ld that is perpendicular to a principal surface of a circuit board when the coil component 1 is mounted on the circuit board. The width direction Wd is one of the directions perpendicular to the length direction Ld that is parallel to the principal surface of the circuit board when the coil component 1 is mounted on the circuit board.

Core Portion

The core portion 11 has a polygonal cross-section along a plane orthogonal to the length direction Ld. In the present embodiment, the core portion 11 has a substantially rectangular cross-section. In this specification, the term “polygonal” covers shapes with chamfered or rounded corners and shapes having partially curved sides. The cross-sectional shape of the core portion 11 is not limited to a polygonal shape, and may be changed to any shape. For example, the cross-sectional shape of the core portion 11 may be a circular shape, an elliptical shape, or a combination of these shapes and a polygonal shape.

In the present embodiment, the core portion 11 has a bottom surface 11*a* and a top surface 11*b* that face away from each other in the height direction Td, and also has a pair of side surfaces 11*c* and 11*d* that face away from each other in the width direction Wd. In the present embodiment, the bottom surface 11*a* is parallel to the top surface 11*b*, and the side surface 11*c* is parallel to the side surface 11*d*. The bottom surface 11*a* faces the circuit board when the coil component 1 is mounted on the circuit board.

First Flange Portion and Second Flange Portion

As illustrated in FIGS. 3 and 4, the first flange portion 12 includes an inner surface 12*a*, an end surface 12*b*, a top surface 12*c*, a bottom surface 12*d*, a first side surface 12*e*, and a second side surface 12*f*. The inner surface 12*a* faces toward the core portion 11 in the length direction Ld. The end surface 12*b* faces away from the inner surface 12*a* in the length direction Ld. The top surface 12*c* and the bottom surface 12*d* face away from each other in the height direction Td, and connect the inner surface 12*a* and the end surface 12*b* to each other. The bottom surface 12*d* faces the circuit board in the height direction Td when the coil component 1 is mounted on the circuit board. The top surface 12*c* faces away from the bottom surface 12*d* in the height direction Td. The first side surface 12*e* and the second side surface 12*f* face away from each other in the width direction Wd, and connect the inner surface 12*a* and the end surface 12*b* to each other and the top surface 12*c* and the bottom surface 12*d* to each other. The second side surface 12*f* faces away from the first side surface 12*e* in the width direction Wd.

The second flange portion 13 includes an inner surface 13*a*, an end surface 13*b*, a top surface 13*c*, a bottom surface 13*d*, a first side surface 13*e*, and a second side surface 13*f*. The inner surface 13*a* faces toward the core portion 11 in the length direction Ld. The end surface 13*b* faces away from the inner surface 13*a* in the length direction Ld. The top surface 13*c* and the bottom surface 13*d* face away from each other in the height direction Td, and connect the inner surface 13*a* and the end surface 13*b* to each other. The bottom surface 13*d* faces the circuit board in the height direction Td when the coil component 1 is mounted on the circuit board. The top surface 13*c* faces away from the bottom surface 13*d* in the height direction Td. The first side surface 13*e* and the second side surface 13*f* face away from each other in the width direction Wd, and connect the inner surface 13*a* and the end surface 13*b* to each other and the top surface 13*c* and the bottom surface 13*d* to each other. The second side surface 13*f* faces away from the first side surface 13*e* in the width direction Wd.

Thus, the bottom surface 11*a* of the core portion 11 is at the same side as the bottom surface 12*d* of the first flange portion 12 and the bottom surface 13*d* of the second flange portion 13 in the height direction Td. In addition, the top surface 11*b* of the core portion 11 is at the same side as the top surface 12*c* of the first flange portion 12 and the top surface 13*c* of second flange portion 13 in the height direction Td.

Leg Portions and Crotch Portions

As illustrated in FIGS. 3 and 4, the first flange portion 12 includes a first main portion 21, a first leg portion 22, and a second leg portion 23. The first leg portion 22 and the second leg portion 23 project from the first main portion 21 in the height direction Td. The first main portion 21 has a main-portion bottom surface 21*d* that faces toward the bottom surface 12*d* of the first flange portion 12. The first leg portion 22 and the second leg portion 23 project from the main-portion bottom surface 21*d* in the height direction Td. The first leg portion 22 and the second leg portion 23 are spaced from each other in the width direction Wd. The first leg portion 22 is disposed adjacent to the first side surface 12*e* of the first flange portion 12 in the width direction Wd. The second leg portion 23 is disposed adjacent to the second side surface 12*f* of the first flange portion 12 in the width direction Wd. The bottom surface 12*d* of the first flange portion 12 includes a first bottom surface 22*d* of the first leg portion 22 and a second bottom surface 23*d* of the second leg portion 23.

The first leg portion 22 and the second leg portion 23 are spaced from each other by a predetermined interval in the width direction Wd. The first flange portion 12 has a first inside surface 22*f*, which is a surface of the first leg portion 22 that faces the second leg portion 23, and a second inside surface 23*e*, which is a surface of the second leg portion 23 that faces the first leg portion 22. In other words, the first flange portion 12 includes the first inside surface 22*f* and the second inside surface 23*e* that face each other in the width direction Wd. The first flange portion 12 has a first crotch portion 24 that is surrounded by the main-portion bottom surface 21*d*, the first leg portion 22, and the second leg portion 23. The main-portion bottom surface 21*d* may be regarded as a crotch surface of the first crotch portion 24.

In the present embodiment, the end surface 12*b*, the first side surface 12*e*, and the second side surface 12*f* are continuous over the first main portion 21, the first leg portion 22, and the second leg portion 23. The length of the bottom surface 12*d* (22*d* and 23*d*) in the length direction Ld is less than that of the top surface 12*c*. The inner surface 12*a* of the first flange portion 12 includes a main-portion inner surface 21*a* of the first main portion 21, inner surfaces 22*a* and 23*a* of the first and second leg portions 22 and 23, respectively, first connecting surfaces 25*a*, and a second connecting surface 25*b*. The first connecting surfaces 25*a* and the second connecting surface 25*b* are provided between the main-portion inner surface 21*a* and the inner surfaces 22*a* and 23*a*. The first connecting surfaces 25*a* are recessed toward the inner region of the first flange portion 12. The second connecting surface 25*b* is a flat surface that is inclined relative to the main-portion inner surface 21*a* and the inner surfaces 22*a* and 23*a*.

As illustrated in FIGS. 3 and 4, the second flange portion 13 includes a second main portion 31, a third leg portion 32, and a fourth leg portion 33. The third leg portion 32 and the fourth leg portion 33 project from the second main portion 31 in the height direction Td. The second main portion 31 has a main-portion bottom surface 31*d* that faces toward the bottom surface 13*d* of the second flange portion 13. The third leg portion 32 and the fourth leg portion 33 project from the main-portion bottom surface 31*d* in the height direction Td. The third leg portion 32 and the fourth leg portion 33 are spaced from each other in the width direction Wd. The third leg portion 32 is disposed adjacent to the first side surface 13*e* of the second flange portion 13 in the width direction Wd. The fourth leg portion 33 is disposed adjacent to the second side surface 13*f* of the second flange portion 13 in the width direction Wd. The bottom surface 13*d* of the second flange portion 13 includes a third bottom surface 32*d* of the third leg portion 32 and a fourth bottom surface 33*d* of the fourth leg portion 33.

The third leg portion 32 and the fourth leg portion 33 are spaced from each other by a predetermined interval in the width direction Wd. The second flange portion 13 has a first inside surface 32*f*, which is a surface of the third leg portion 32 that faces the fourth leg portion 33, and a second inside surface 33*e*, which is a surface of the fourth leg portion 33 that faces the third leg portion 32. In other words, the second flange portion 13 includes the first inside surface 32*f* and the second inside surface 33*e* that face each other in the width direction Wd. The second flange portion 13 has a second crotch portion 34 that is surrounded by the main-portion bottom surface 31*d*, the third leg portion 32, and the fourth leg portion 33. The main-portion bottom surface 31*d* may be regarded as a crotch surface of the second crotch portion 34.

In the present embodiment, the end surface 13*b*, the first side surface 13*e*, and the second side surface 13*f* are continuous over the second main portion 31, the third leg portion 32, and the fourth leg portion 33. The length of the bottom surface 13*d* (32*d* and 33*d*) in the length direction Ld is less than that of the top surface 13*c*. The inner surface 13*a* of the second flange portion 13 includes a main-portion inner surface 31*a* of the second main portion 31, inner surfaces 32*a* and 33*a* of the third and fourth leg portions 32 and 33, respectively, first connecting surfaces 35*a*, and a second connecting surface 35*b*. The first connecting surfaces 35*a* and the second connecting surface 35*b* are provided between the main-portion inner surface 31*a* and the inner surfaces 32*a* and 33*a*. The first connecting surfaces 35*a* are recessed toward the inner region of the first flange portion 12. The second connecting surface 35*b* is a flat surface that is inclined relative to the main-portion inner surface 31*a* and the inner surfaces 32*a* and 33*a*.

Figure 8:
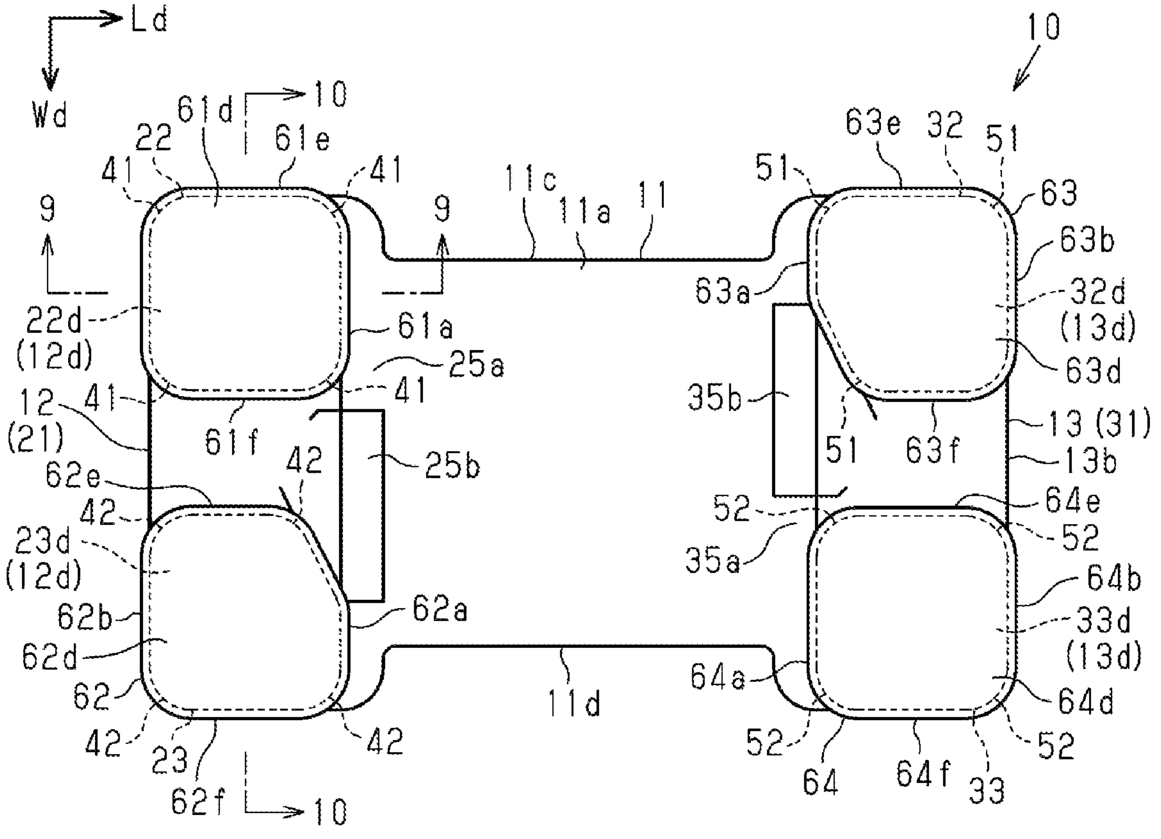
FIG. 8 is a bottom view of the drum-shaped core and the terminal electrodes.

As illustrated in FIG. 8, the first leg portion 22 includes ridge portions 41 that define the boundaries between the end surface 12*b*, the first side surface 12*e*, the inner surface 22*a*, and the first inside surface 22*f*, which are peripheral surfaces of the first leg portion 22 that face in the length direction Ld or the width direction Wd. The ridge portions 41 each have a curved surface that is convex toward the outside of the first leg portion 22. The second leg portion 23 includes ridge portions 42 that define the boundaries between the end surface 12*b*, the second side surface 12*f*, the inner surface 22*a*, and the second inside surface 23*e*, which are peripheral surfaces of the second leg portion 23 that face in the length direction Ld or the width direction Wd. The ridge portions 42 each have a curved surface that is convex toward the outside of the second leg portion 23.

The third leg portion 32 includes ridge portions 51 that define the boundaries between the end surface 13*b*, the first side surface 13*e*, the inner surface 32*a*, and the first inside surface 32*f*, which are peripheral surfaces of the third leg portion 32 that face in the length direction Ld or the width direction Wd. The ridge portions 51 each have a curved surface that is convex toward the outside of the third leg portion 32. The fourth leg portion 33 includes ridge portions 52 that define the boundaries between the end surface 13*b*, the second side surface 12*f*, the inner surface 33*a*, and the second inside surface 33*e*, which are peripheral surfaces of the fourth leg portion 33 that face in the length direction Ld or the width direction Wd. The ridge portions 52 each have a curved surface that is convex toward the outside of the fourth leg portion 33.

As illustrated in FIGS. 3 and 4, the first leg portion 22 includes rounded ridge portions 43 that define the boundaries between the first bottom surface 22*d* and each of the end surface 12*b*, the first side surface 12*e*, the inner surface 12*a*, and the first inside surface 22*f*. The ridge portions 43 each have a curved surface that is convex toward the outside of the first leg portion 22. The second leg portion 23 includes rounded ridge portions 44 that define the boundaries between the second bottom surface 23*d* and each of the end surface 12*b*, the second side surface 12*f*, the inner surface 12*a*, and the second inside surface 23*e*. The ridge portions 44 each have a curved surface that is convex toward the outside of the second leg portion 23.

The third leg portion 32 includes rounded ridge portions 53 that define the boundaries between the third bottom surface 32*d* and each of the end surface 13*b*, the first side surface 13*e*, the inner surface 13*a*, and the first inside surface 32*f*. The ridge portions 53 each have a curved surface that is convex toward the outside of the third leg portion 32. The fourth leg portion 33 includes rounded ridge portions 54 that define the boundaries between the fourth bottom surface 33*d* and each of the end surface 13*b*, the second side surface 13*f*, the inner surface 13*a*, and the second inside surface 33*e*. The ridge portions 54 each have a curved surface that is convex toward the outside of the fourth leg portion 33.

Terminal Electrodes

As illustrated in FIGS. 1 and 2, a first terminal electrode 61 and a second terminal electrode 62 are provided on the first flange portion 12. The first terminal electrode 61 is provided on the first leg portion 22, and the second terminal electrode 62 is provided on the second leg portion 23. The first crotch portion 24 is disposed between the first terminal electrode 61 and the second terminal electrode 62. Therefore, the first terminal electrode 61 and the second terminal electrode 62 are not electrically connected to each other. The first terminal electrode 61 has a surface including rounded ridge portions on the ridge portions 41 and 43 of the first leg portion 22. The second terminal electrode 62 has a surface including rounded ridge portions on the ridge portions 42 and 44 of the second leg portion 23.

As illustrated in FIGS. 1 and 2, a third terminal electrode 63 and a fourth terminal electrode 64 are provided on the second flange portion 13. The third terminal electrode 63 is provided on the third leg portion 32. The third leg portion 32 is at the same side as the first leg portion 22 of the first flange portion 12, on which the first terminal electrode 61 is provided, in the width direction Wd. The fourth terminal electrode 64 is provided on the fourth leg portion 33. The fourth leg portion 33 is at the same side as the second leg portion 23 of the first flange portion 12, on which the second terminal electrode 62 is provided, in the width direction Wd. The second crotch portion 34 is disposed between the third terminal electrode 63 and the fourth terminal electrode 64. Therefore, the third terminal electrode 63 and the fourth terminal electrode 64 are not electrically connected to each other. The third terminal electrode 63 has a surface including rounded ridge portions on the ridge portions 51 and 53 of the third leg portion 32. The fourth terminal electrode 64 has a surface including rounded ridge portions on the ridge portions 52 and 54 of the fourth leg portion 33.

Wires

As illustrated in FIGS. 1 and 2, the coil 80 includes a first wire 81 and a second wire 82 that are wound around the core portion 11.

The first wire 81 includes a first end 81*a* and a second end 81*b*. For example, the first end 81*a* of the first wire 81 constitutes a winding start end portion of the first wire 81, and the second end 81*b* of the first wire 81 constitutes a winding finish end portion of the first wire 81. The first end 81*a* of the first wire 81 is connected to the first terminal electrode 61, and the second end 81*b* of the first wire 81 is connected to the third terminal electrode 63.

The second wire 82 includes a first end 82*a* and a second end 82*b*. For example, the first end 82*a* of the second wire 82 constitutes a winding start end portion of the second wire 82, and the second end 82*b* of the second wire 82 constitutes a winding finish end portion of the second wire 82. The first end 82*a* of the second wire 82 is connected to the second terminal electrode 62, and the second end 82*b* of the second wire 82 is connected to the fourth terminal electrode 64.

Details of Terminal Electrodes

Figure 7:
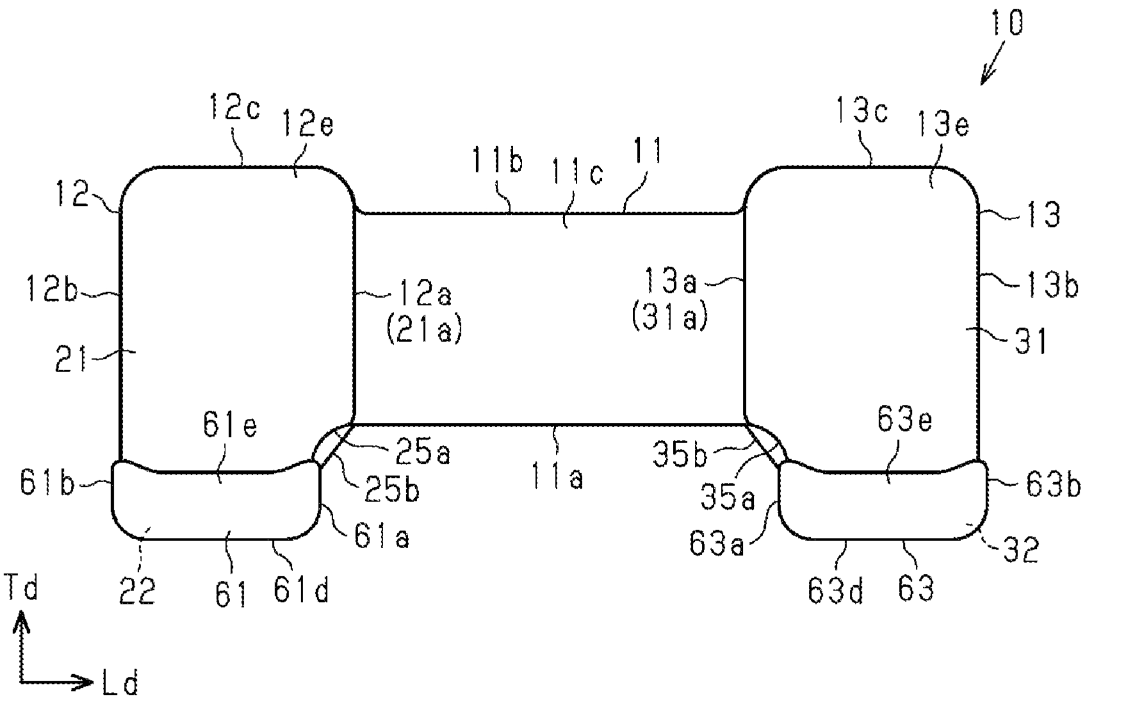
FIG. 7 is a side view of the drum-shaped core and terminal electrodes.

As illustrated in FIGS. 7 and 8, the first terminal electrode 61 includes a bottom-surface electrode portion 61*d* on the first bottom surface 22*d* of the first leg portion 22, an end-surface electrode portion 61*b* on the end surface 12*b* of the first flange portion 12, an inner-surface electrode portion 61*a* on the inner surface 12*a* of the first flange portion 12, a side-surface electrode portion 61*e* on the first side surface 12*e* of the first flange portion 12, and an inside-surface electrode portion 61*f* on the first inside surface 22*f* of the first leg portion 22. The bottom-surface electrode portion 61*d*, the end-surface electrode portion 61*b*, the inner-surface electrode portion 61*a*, the side-surface electrode portion 61*e*, and the inside-surface electrode portion 61*f* are formed to be continuous with each other.

The second terminal electrode 62 includes a bottom-surface electrode portion 62*d* on the second bottom surface 23*d* of the second leg portion 23, an end-surface electrode portion 62*b* on the end surface 12*b* of the first flange portion 12, an inner-surface electrode portion 62*a* on the inner surface 12*a* of the first flange portion 12, a side-surface electrode portion 62*f* on the second side surface 12*f* of the first flange portion 12, and an inside-surface electrode portion 62*e* on the second inside surface 23*e* of the second leg portion 23. The bottom-surface electrode portion 62*d*, the end-surface electrode portion 62*b*, the inner-surface electrode portion 62*a*, the side-surface electrode portion 62*f*, and the inside-surface electrode portion 62*e* are formed to be continuous with each other.

The third terminal electrode 63 includes a bottom-surface electrode portion 63*d* on the third bottom surface 32*d* of the third leg portion 32, an end-surface electrode portion 63*b* on the end surface 13*b* of the second flange portion 13, an inner-surface electrode portion 63*a* on the inner surface 13*a* of the second flange portion 13, a side-surface electrode portion 63*e* on the first side surface 13*e* of the second flange portion 13, and an inside-surface electrode portion 63*f* on the first inside surface 32*f* of the third leg portion 32. The bottom-surface electrode portion 63*d*, the end-surface electrode portion 63*b*, the inner-surface electrode portion 63*a*, the side-surface electrode portion 63*e*, and the inside-surface electrode portion 63*f* are formed to be continuous with each other.

The fourth terminal electrode 64 includes a bottom-surface electrode portion 64*d* on the fourth bottom surface 33*d* of the fourth leg portion 33, an end-surface electrode portion 64*b* on the end surface 13*b* of the second flange portion 13, an inner-surface electrode portion 64*a* on the inner surface 13*a* of the second flange portion 13, a side-surface electrode portion 64*f* on the second side surface 13*f* of the second flange portion 13, and an inside-surface electrode portion 64*e* on the second inside surface 33*e* of the fourth leg portion 33. The bottom-surface electrode portion 64*d*, the end-surface electrode portion 64*b*, the side-surface electrode portion 64*f*, the inner-surface electrode portion 64*a*, and the inside-surface electrode portion 64*e* are formed to be integral and continuous with each other.

The first terminal electrode 61, the second terminal electrode 62, the third terminal electrode 63, and the fourth terminal electrode 64 each include a base electrode 71 and a plating layer 72 that covers the base electrode 71. The base electrode 71 is, for example, a metal layer containing silver (Ag) as a main component thereof. The base electrode 71 may also contain, for example, silica or a resin.

Figure 9:
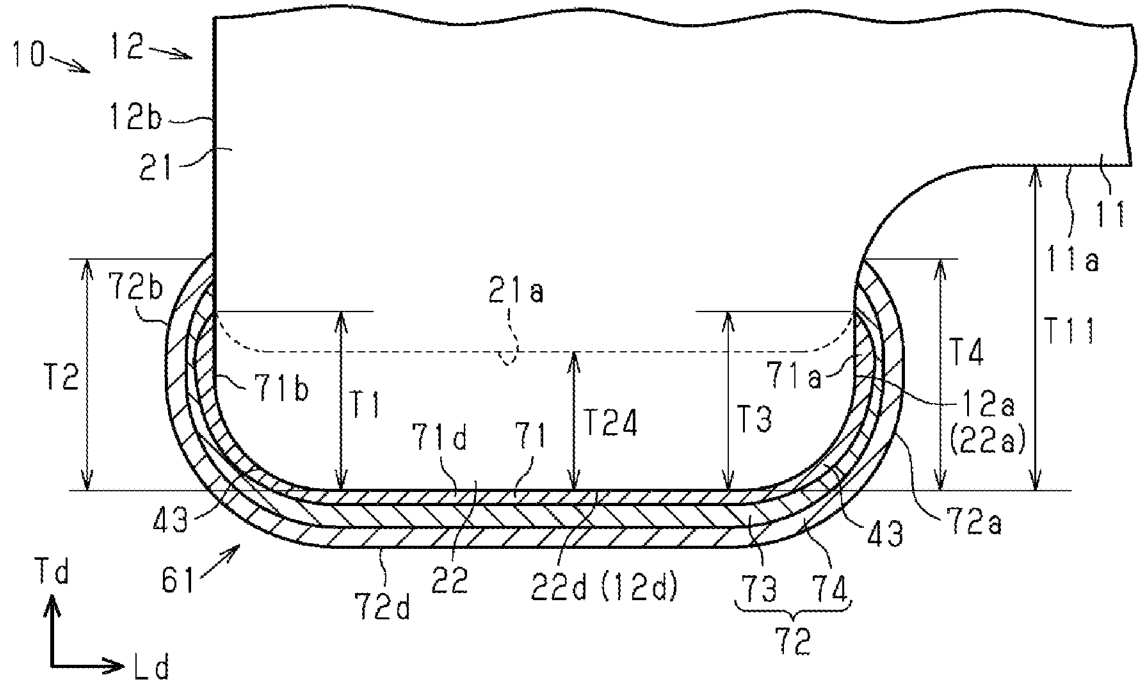
FIG. 9 is a sectional view taken along line 9-9 in FIG. 8.
Figure 10:
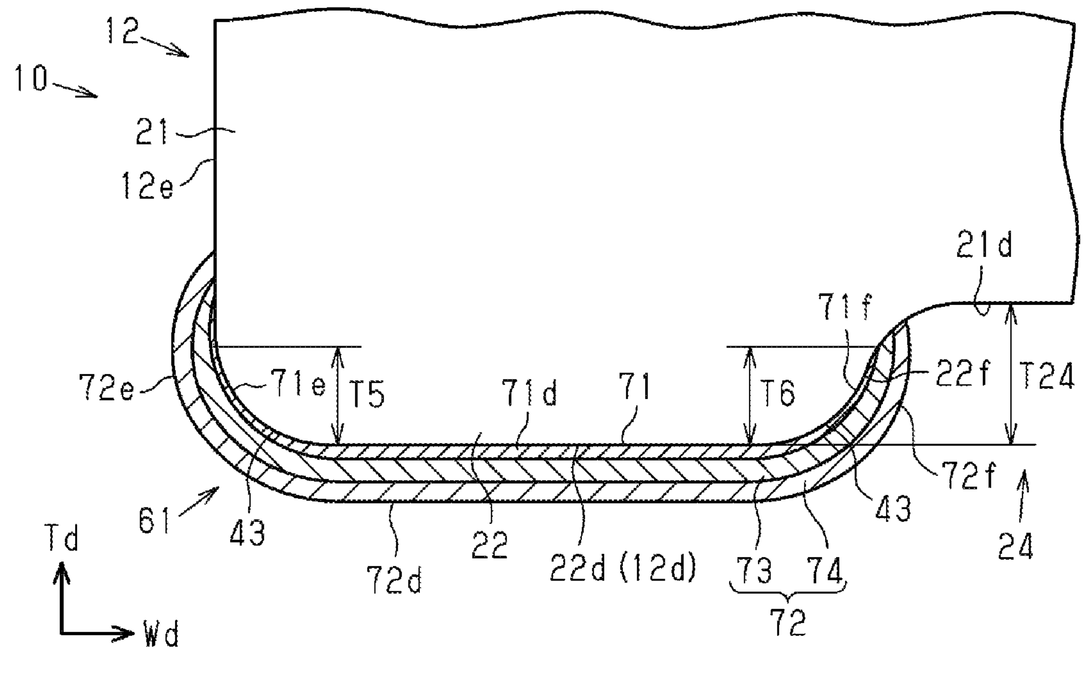
FIG. 10 is a sectional view taken along line 10-10 in FIG. 8.

The base electrode 71 and the plating layer 72 that constitute each of the first to fourth terminal electrodes 61 to 64 will now be described in detail. FIGS. 9 and 10 illustrate a member on which the first terminal electrode 61 is provided as well as the base electrode 71 and the plating layer 72 that constitute the first terminal electrode 61. The first to fourth terminal electrodes 61 to 64 have the same structure. Therefore, the relationship between the member on which the first terminal electrode 61 is provided, the base electrode 71, and the plating layer 72 will be mainly described, and illustration and description of the structures of the second to fourth terminal electrodes 62 to 64 will be omitted.

Figure 5:
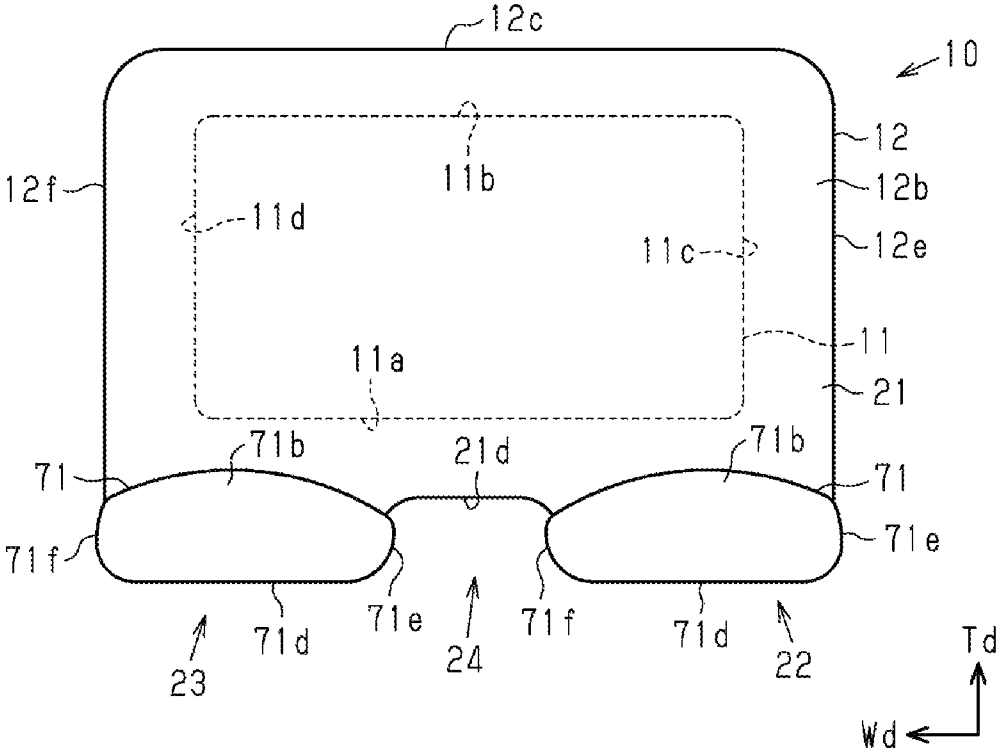
FIG. 5 is an end view of the drum-shaped core on which a base electrode is formed.
Figure 6:
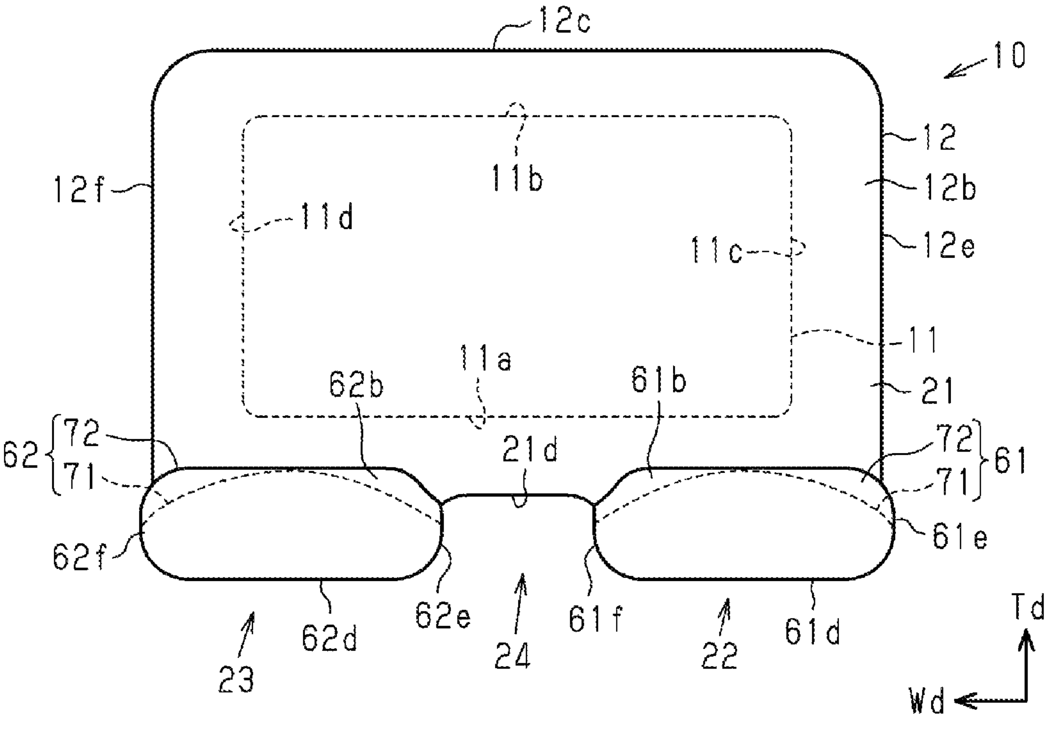
FIG. 6 is an end view of the drum-shaped core on which a plating electrode is formed.

As illustrated in FIGS. 5, 8, 9, and 10, the base electrode 71 includes a bottom-surface base electrode portion 71*d* formed on the bottom surface 12*d* (22*d*), an end-surface base electrode portion 71*b* formed on the end surface 12*b*, a side-surface base electrode portion 71*e* formed on the first side surface 12*e*, an inner-surface base electrode portion 71*a* formed on the inner surface 12*a*, and an inside-surface base electrode portion 71*f* formed on the first inside surface 22*f*. The bottom-surface base electrode portion 71*d* is formed to be integral and continuous with each of the end-surface base electrode portion 71*b*, the inner-surface base electrode portion 71*a*, the side-surface base electrode portion 71*e*, and the inside-surface base electrode portion 71*f*. The end-surface base electrode portion 71*b*, the side-surface base electrode portion 71*e*, the inner-surface base electrode portion 71*a*, and the inside-surface base electrode portion 71*f* are formed to be integral and continuous with each other. As illustrated in FIGS. 5 and 6, the base electrode 71 on the second leg portion 23 includes the base electrode portion 71*f* (side-surface base electrode portion) formed on the second side surface 12*f* of the first flange portion 12 and the base electrode portion 71*e* (inside-surface base electrode portion) formed on the second inside surface 23*e* (see FIG. 4) that is adjacent to the first crotch portion 24.

As illustrated in FIG. 9, the end-surface base electrode portion 71*b* has a height T1 greater than a height T24 of the first crotch portion 24. In this specification, the bottom surfaces 12*d* (22*d* and 23*d*) and 13*d* (32*d* and 33*d*) define a height reference plane. The height of each portion the base electrode 71 is given as a maximum height from the height reference plane (first bottom surface 22*d* of the first leg portion 22) toward the top surface 12*c* of the first flange portion 12 in the height direction Td. The height (crotch height) T24 of the first crotch portion 24 is given as the height from the height reference plane for the base electrode (first bottom surface 22*d* of the first leg portion 22) to the crotch surface of the first crotch portion 24 (main-portion bottom surface 21*d* of the main portion) in the height direction Td. The inner-surface base electrode portion 71*a* has a height T3 greater than the height T24 of the first crotch portion 24.

As illustrated in FIG. 10, the side-surface base electrode portion 71*e* on the first leg portion 22 has a height T5 less than the height T24 of the first crotch portion 24. The inside-surface base electrode portion 71*f* on the first leg portion 22 has a height T6 less than the height of the first inside surface 22*f*. As illustrated in FIG. 5, this also applies to the second leg portion 23. More specifically, the side-surface base electrode portion 71*f* on the second leg portion 23 has the height T5 less than the height T24 of the first crotch portion 24. The inside-surface base electrode portion 71*e* on the second leg portion 23 has the height T6 less than the height of the second inside surface 23*e* (see FIG. 4).

As illustrated in FIGS. 1 and 5, the end-surface base electrode portion 71*b* of the first terminal electrode 61 on the end surface 12*b* of the first flange portion 12 is formed such that a central portion thereof in the width direction Wd has the maximum height. In other words, the upper edge of the end-surface base electrode portion 71*b* of the first terminal electrode 61 is convexly curved toward the top surface 12*c* of the first flange portion 12. The end-surface base electrode portion 71*b* of the second terminal electrode 62 is formed such that a central portion thereof in the width direction Wd has the maximum height. The upper edge of the end-surface base electrode portion 71*b* of the second terminal electrode 62 is convexly curved toward the top surface 12*c* of the first flange portion 12.

As illustrated in FIG. 2, the end-surface base electrode portion 71*b* of the third terminal electrode 63 on the end surface 13*b* of the second flange portion 13 is formed such that a central portion thereof in the width direction Wd has the maximum height. In other words, the upper edge of the end-surface base electrode portion 71*b* of the third terminal electrode 63 is convexly curved toward the top surface 13*c* of the second flange portion 13. The end-surface base electrode portion 71*b* of the fourth terminal electrode 64 is formed such that the central portion thereof in the width direction Wd has the maximum height. The upper edge of the end-surface base electrode portion 71*b* of the fourth terminal electrode 64 is convexly curved toward the top surface 13*c* of the second flange portion 13.

As illustrated in FIG. 9, the end-surface base electrode portion 71*b* on the end surface 12*b* of the first flange portion 12 and the inner-surface base electrode portion 71*a* on the inner surface 12*a* of the first flange portion 12 have the same thickness. In this specification, the term "same" includes the case where two values are equal and the case where two values have a difference due to errors caused by, for example, variations in manufacturing processes. The errors cause by, for example, variations in manufacturing processes are less than or equal to about ±10 μm. As illustrated in FIG. 10, the side-surface base electrode portion 71*e* on the first side surface 12*e* and the inside-surface base electrode portion 71*f* on the first inside surface 22*f* have the same thickness. The thickness of the end-surface base electrode portion 71*b* is greater than the thickness of the side-surface base electrode portion 71*e*. In this specification, the thickness of each portion of the base electrode is given as the maximum thickness from the surface on which the base electrode is formed to the surface of the base electrode.

As illustrated in FIGS. 6, 8, 9, and 10, the plating layer 72 includes a bottom-surface plating layer portion 72*d* on the first bottom surface 22*d* (12*d*), an end-surface plating layer portion 72*b* on the end surface 12*b*, a side-surface plating layer portion 72*e* on the first side surface 12*e*, an inner-surface plating layer portion 72*a* on the inner surface 12*a* (22*a*), and an inside-surface plating layer portion 72*f* on the first inside surface 22*f*. The bottom-surface plating layer portion 72*d* is formed to be integral and continuous with each of the end-surface plating layer portion 72*b*, the inner-surface plating layer portion 72*a*, the side-surface plating layer portion 72*e*, and the inside-surface plating layer portion 72*f*. The end-surface plating layer portion 72*b*, the side-surface plating layer portion 72*e*, the inner-surface plating layer portion 72*a*, and the inside-surface plating layer portion 72*f* are formed to be integral and continuous with each other.

As illustrated in FIGS. 9 and 10, the plating layer 72 according to the present embodiment includes a first plating layer 73 that covers the base electrode 71 and a second plating layer 74 that covers the first plating layer 73. The first plating layer 73 is made of, for example, a metal, such as nickel (Ni) or copper (Cu), or an alloy, such as a nickel-chromium (Ni—Cr) alloy or a Ni—Cu alloy. The second plating layer 74 is made of, for example, a metal, such as tin (Sn). The plating layer 72 may instead be composed of a single plating layer or three or more plating layers.

As illustrated in FIGS. 1 and 6, the end-surface plating layer portion 72*b* of the first terminal electrode 61 on the end surface 12*b* of the first flange portion 12 is formed to have a constant height in the width direction Wd. In other words, the upper edge of the end-surface plating layer portion 72*b* of the first terminal electrode 61 extends straight in the width direction Wd. The end-surface plating layer portion 72*b* of the first terminal electrode 61 substantially has an elongated rectangular shape that extends in the width direction Wd when viewed in the length direction Ld. The end-surface plating layer portion 72*b* of the second terminal electrode 62 is formed to have a constant height in the width direction Wd. The upper edge of the end-surface plating layer portion 72*b* of the second terminal electrode 62 extends straight in the width direction Wd. The end-surface plating layer portion 72*b* of the second terminal electrode 62 substantially has an elongated rectangular shape that extends in the width direction Wd when viewed in the length direction Ld.

As illustrated in FIG. 2, the end-surface plating layer portion 72*b* of the third terminal electrode 63 on the end surface 13*b* of the second flange portion 13 is formed to have a constant height in the width direction Wd. In other words, the upper edge of the end-surface plating layer portion 72*b* of the third terminal electrode 63 extends straight in the width direction Wd. The end-surface plating layer portion 72*b* of the third terminal electrode 63 substantially has an elongated rectangular shape that extends in the width direction Wd when viewed in the length direction Ld. The end-surface plating layer portion 72*b* of the fourth terminal electrode 64 is formed to have a constant height in the width direction Wd. The upper edge of the end-surface plating layer portion 72*b* of the fourth terminal electrode 64 extends straight in the width direction Wd. The end-surface plating layer portion 72*b* of the fourth terminal electrode 64 substantially has an elongated rectangular shape that extends in the width direction Wd when viewed in the length direction Ld.

Plate-Shaped Member

As illustrated in FIGS. 1 and 2, the coil component 1 includes a plate-shaped member 90. The plate-shaped member 90 is substantially rectangular-parallelepiped-shaped. The plate-shaped member 90 has a first surface 91 that faces the drum-shaped core 10 in the height direction Td and a second surface 92 that faces away from the first surface 91. The plate-shaped member 90 is disposed to connect the top surface 12*c* of the first flange portion 12 and the top surface 13*c* of the second flange portion 13 to each other. In the present embodiment, the plate-shaped member 90 is attached to the first flange portion 12 so as to cover the entirety of the top surface 12*c* of the first flange portion 12, and is attached to the second flange portion 13 so as to cover the entirety of the top surface 13*c* of the second flange portion 13.

The plate-shaped member 90 is made of a non-conductive material, for example, a magnetic material, such as nickel-zinc (Ni—Zn) based ferrite, or a non-magnetic material, such as alumina. The plate-shaped member 90 is formed by, for example, firing a compact obtained by compressing a non-conductive material. The plate-shaped member 90 is not limited to those formed by firing a compact obtained by compressing a non-conductive material, and may instead be formed by, for example, heat-curing a resin containing magnetic powder, such as metal powder or ferrite powder, a resin containing non-magnetic powder, such as silica powder, or a resin containing no fillers.

The second surface 92 of the plate-shaped member 90, which is substantially rectangular-parallelepiped-shaped, serves as a suction surface when the coil component 1 is moved. Therefore, when, for example, the coil component 1 is mounted on the circuit board, the coil component 1 can be easily moved onto the circuit board by a vacuum transport device. Similar to the drum-shaped core 10, the plate-shaped member 90 may be made of a magnetic material. When the plate-shaped member 90 is made of a magnetic material, a closed magnetic circuit may be constituted by the drum-shaped core 10 and the plate-shaped member 90. Accordingly, the inductance acquisition efficiency can be increased.

The plate-shaped member 90 is attached to the drum-shaped core 10 by an adhesive. The adhesive may be an epoxy resin-based adhesive. An inorganic filler is preferably added to the adhesive. In such a case, the coefficient of linear expansion of the adhesive is reduced, so that thermal shock resistance is increased.

Method for Manufacturing Coil Component

A method for manufacturing the coil component 1 will now be described with reference to FIGS. 11 to 17.

Figure 17:
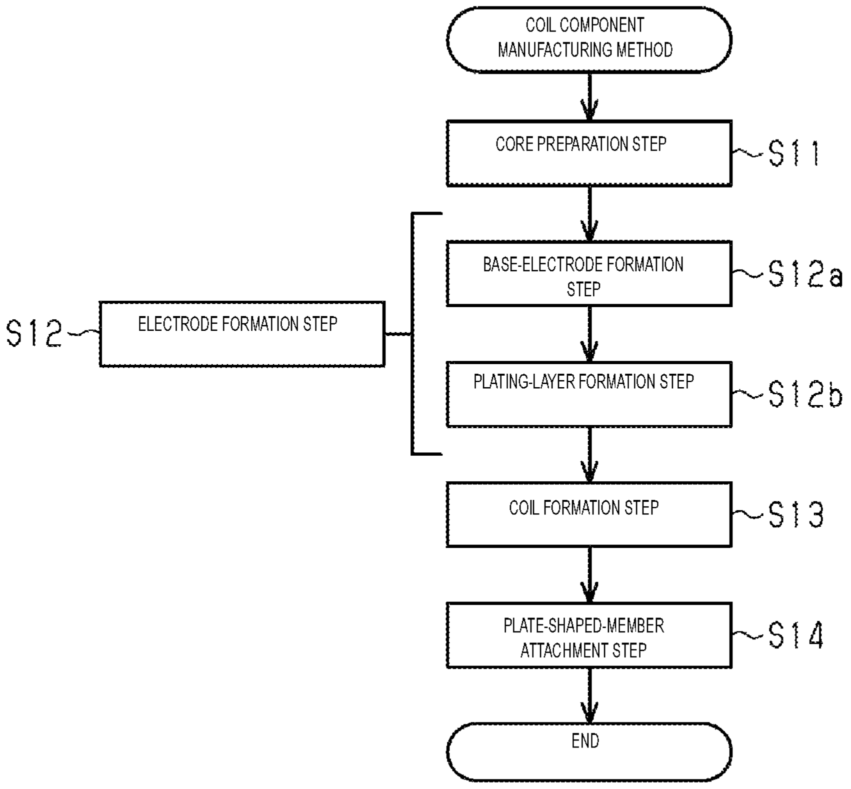
FIG. 17 is a flowchart of an example of a method for manufacturing the coil component.

Referring to FIG. 17, the method for manufacturing the coil component 1 includes a core preparation step (step S11), an electrode formation step (step S12), a coil formation step (step S13), and a plate-shaped-member attachment step (step S14).

Core Preparation Step

In the core preparation step, the drum-shaped core 10 illustrated in FIGS. 3 and 4 is prepared. The drum-shaped core 10 is formed by a step of forming a compact by compressing a non-conductive material by using a mold and a step of firing the compact.

Electrode Formation Step

The electrode formation step (step S12) includes a base-electrode formation step (step S12*a*) and a plating-layer formation step (step S12*b*).

In the base-electrode formation step, the base electrode 71 of each of the terminal electrodes 61 to 64 is formed on the first flange portion 12 and the second flange portion 13 of the drum-shaped core 10 by a dip coating apparatus 110 illustrated in FIGS. 11 to 16.

Base-Electrode Formation Step

Referring to FIGS. 11 to 17, in the base-electrode formation step, the base electrode 71 of each of the terminal electrodes 61 to 64 is formed on the first flange portion 12 and the second flange portion 13 of the drum-shaped core 10 by the dip coating apparatus 110.

Figure 11:
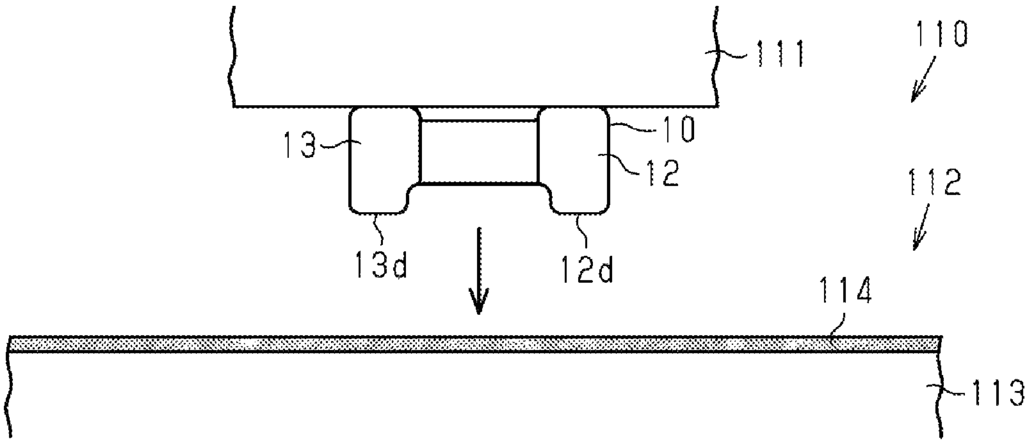
FIG. 11 illustrates a process of forming the base electrode.

More specifically, as illustrated in FIG. 11, the dip coating apparatus 110 includes a holding device 111 and a coating bath 112. The coating bath 112 includes a surface plate 113, and conductive paste 114 is provided on the surface plate 113. The thickness of the conductive paste provided on the surface plate 113 is set in accordance with the size of the first to fourth leg portions 22 to 33 of the drum-shaped core 10. The thickness of the conductive paste 114 is, for example, greater than or equal to about 10 μm and less than or equal to about 20 μm (i.e., from about 10 μm to about 20 μm). The conductive paste 114 is paste containing silver (Ag), silica, and a resin component.

The holding device 111 holds the drum-shaped core 10 so that the bottom surface 12*d* of the first flange portion 12 and the bottom surface 13*d* of the second flange portion 13 of the drum-shaped core 10 face the conductive paste 114 provided in the coating bath 112.

Figure 12:
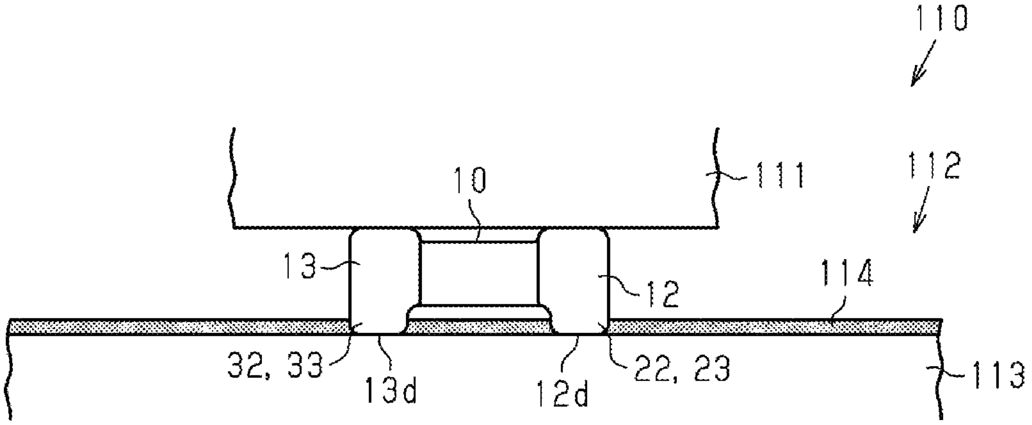
FIG. 12 illustrates the process of forming the base electrode.

As illustrated in FIG. 12, the drum-shaped core 10 is dip-coated with the conductive paste 114 (first step). The holding device 111 inserts the drum-shaped core 10 into the coating bath 112 to bring the bottom surfaces 12*d* and 13*d* of the drum-shaped core 10 into contact with the upper surface of the surface plate 113 of the coating bath 112 so that the first leg portion 22 and the second leg portion 23 of the first flange portion 12 and the third leg portion 32 and the fourth leg portion 33 of the second flange portion 13 of the drum-shaped core 10 are dipped in the conductive paste 114.

Figure 13:
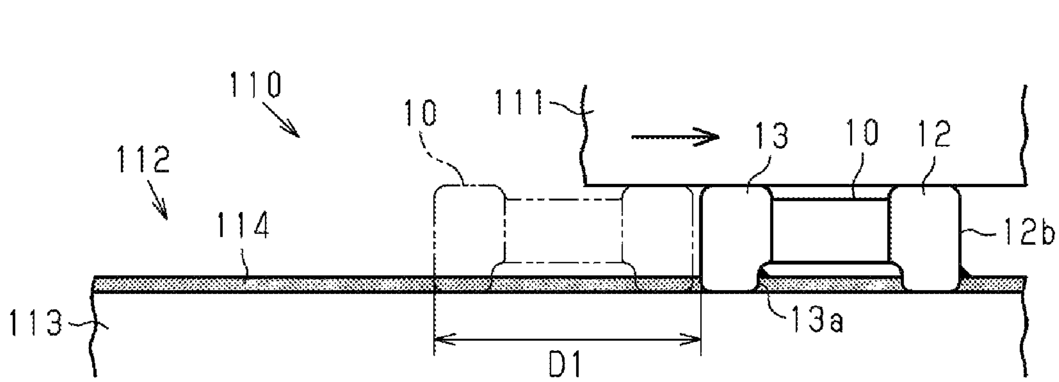
FIG. 13 illustrates the process of forming the base electrode.

As illustrated in FIG. 13, the drum-shaped core 10 is moved in the length direction Ld of the drum-shaped core 10 by a predetermined first distance D1 (second step). At this time, the drum-shaped core 10 is not moved in the width direction Wd of the drum-shaped core 10. In the second step, the conductive paste 114 spreads upward along the end surface 12*b* of the first flange portion 12 and the inner surface 13*a* of the second flange portion 13. The first distance D1 is set in accordance with, for example, the viscosity of the conductive paste 114 (for example, about 20 Pa·s) and the size of the drum-shaped core 10. The first distance D1 is, for example, greater than or equal to about 600 μm and less than or equal to about 750 μm (i.e., from about 600 μm to about 750 μm).

Figure 14:
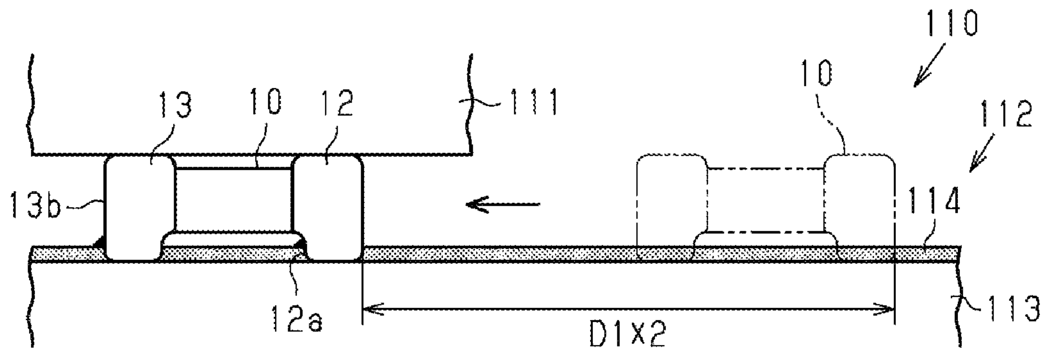
FIG. 14 illustrates the process of forming the base electrode.

As illustrated in FIG. 14, the drum-shaped core 10 is moved in a direction opposite to the direction of movement in the second step by a distance that is twice the predetermined first distance D1 (third step). At this time, the drum-shaped core 10 is not moved in the width direction Wd of the drum-shaped core 10. In the third step, the conductive paste 114 spreads upward along the end surface 13*b* of the second flange portion 13 and the inner surface 12*a* of the first flange portion 12.

Figure 15:
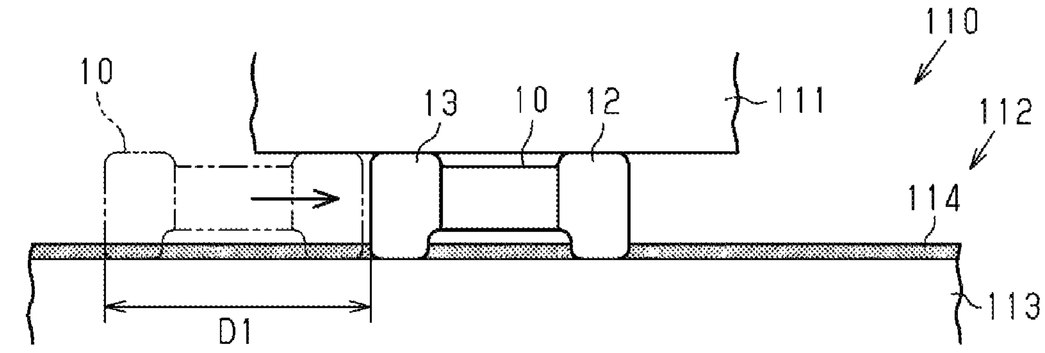
FIG. 15 illustrates the process of forming the base electrode.

As illustrated in FIG. 15, the drum-shaped core 10 is moved in the direction of movement in the second step by the predetermined first distance D1 (fourth step). At this time, the drum-shaped core 10 is not moved in the width direction Wd of the drum-shaped core 10.

Thus, in the second to fourth steps, the drum-shaped core 10 is moved back and forth relative to the conductive paste 114. Since the drum-shaped core 10 is moved back and forth, the conductive paste 114 adheres to the end surfaces 12*b* and 13*b* and the inner surfaces 12*a* and 13*a* of the drum-shaped core 10.

Figure 16:
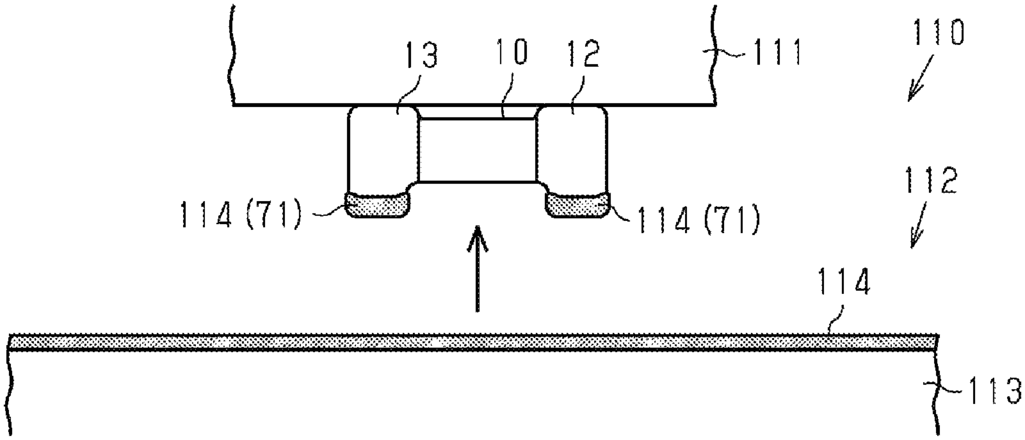
FIG. 16 illustrates the process of forming the base electrode.

As illustrated in FIG. 16, the holding device 111 is moved upward to move the drum-shaped core 10 held by the holding device 111 upward away from the conductive paste 114 (fifth step).

The base electrode 71 is formed by firing the conductive paste 114 applied to the drum-shaped core 10 as described above. The conductive paste 114 is fired at a temperature of, for example, about 900 degrees. The resin component is vaporized during the firing process.

Plating-Layer Formation Step

In the plating-layer formation step, the plating layer 72 is formed to cover the base electrode 71 formed on the drum-shaped core 10 as described above. The plating layer 72 is formed by, for example, electrolytic barrel plating. As illustrated in FIGS. 9 and 10, the plating layer 72 includes the first plating layer 73 and the second plating layer 74. The first plating layer 73 (for example, Ni layer) and the second plating layer 74 (for example, Sn layer) are formed in that order by electrolytic barrel plating.

Coil Formation Step

In the coil formation step, the coil 80 is wound around the drum-shaped core 10 having the terminal electrodes 61 to 64 formed thereon by using a coil winder. The coil 80 includes the first wire 81 and the second wire 82. First, the first end 81*a* of the first wire 81 is attached to the first terminal electrode 61 by thermal compression bonding, and the first end 82*a* of the second wire 82 is attached to the second terminal electrode 62 by thermal compression bonding. Next, the first wire 81 and the second wire 82 are simultaneously wound around the core portion 11 of the drum-shaped core 10. Next, the second end 81*b* of the first wire 81 is attached to the third terminal electrode 63 by thermal compression bonding, and the second end 82*b* of the second wire 82 is attached to the fourth terminal electrode 64 by thermal compression bonding. Then, the first wire 81 and the second wire 82 are cut between the coil winder and the drum-shaped core 10.

Plate-Shaped-Member Attachment Step

In the plate-shaped-member attachment step, the plate-shaped member 90 is attached to the drum-shaped core 10 with an adhesive.

The coil component 1 is manufactured by the above-described steps.

Operation

Figure 18:
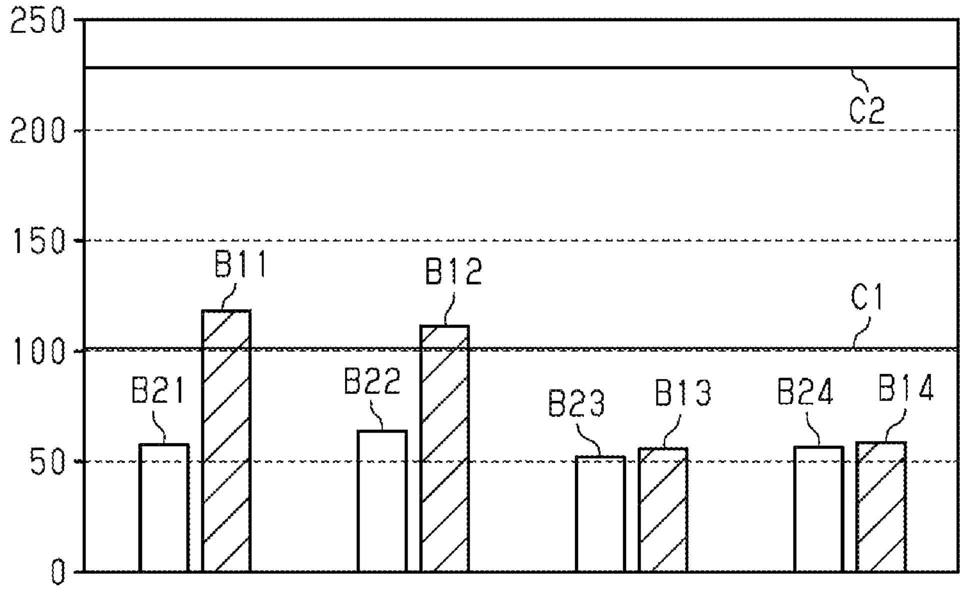
FIG. 18 is a graph showing the heights of portions of a terminal electrode according to the embodiment and portions of a terminal electrode according to a comparative example.

FIG. 18 shows the heights of portions of the base electrode 71 of the coil component 1 according to the present embodiment and the heights of portions of a base electrode of a coil component according to a comparative example. Referring to FIG. 18, cross-hatched bars B11 to B14 show the measured heights of the portions of the base electrode 71 of the coil component 1 according to the present embodiment, and blank bars B21 to B24 show the measured heights of portions of the base electrode of the coil component according to the comparative example. In FIG. 18, the solid line C1 shows the crotch height T24, and the solid line C2 shows a core height T11.

In FIG. 18, bars B11 and B21 show the height T1 of the end-surface base electrode portion 71*b*. Bars B12 and B22 show the height T3 of the inner-surface base electrode portion 71*a*. Bars B13 and B23 show the height T5 of the side-surface base electrode portion 71*e*. Bars B14 and B24 show the height T6 of the inside-surface base electrode portion 71*f*.

The coil component according to the comparative example is manufactured by using a drum-shaped core having the same size and shape as those of the drum-shaped core 10 of the coil component 1 according to the present embodiment and performing the first step illustrated in FIG. 12 (step of dip-coating the drum-shaped core with conductive paste) and the fifth step illustrated in FIG. 16 (step of moving the drum-shaped core upward). In other words, the coil component according to the comparative example is obtained by forming the base electrode without moving the drum-shaped core back and forth.

Table 1 given below shows the heights of portions of the base electrode 71 of the coil component 1 according to the present embodiment and the heights of portions of the base electrode of the coil component according to the comparative example. For each of the coil component 1 according to the present embodiment and the coil component according to the comparative example, the height of each portion of the base electrode shown in Table 1 is the average of measured heights of ten samples.

TABLE 1

| Sample | End-Surface Height | Inner-Surface Height | Side-Surface Height | Inside-Surface Height |
|---|---|---|---|---|
| Comparative Example | 59.1 | 64.6 | 52.2 | 56.7 |
| Embodiment | 118.8 | 111.3 | 56.1 | 57.9 |

As is clear from FIG. 18 and Table 1, the coil component according to comparative example is formed such that the end-surface base electrode portion 71*b*, the inner-surface base electrode portion 71*a*, the side-surface base electrode portion 71*e*, and the inside-surface base electrode portion 71*f* have substantially the same height.

The coil component 1 according to the present embodiment is formed such that the height T1 of the end-surface base electrode portion 71*b* is greater than the crotch height T24. More specifically, in the step of forming the base electrode, the drum-shaped core 10 is moved back and forth in the length direction of the drum-shaped core 10, so that the height T1 of the portion of the base electrode 71 (end-surface base electrode portion 71*b*) on each of the end surfaces 12*b* and 13*b* of the drum-shaped core 10 is greater than the crotch height T24. Accordingly, the terminal electrodes 61 to 64, which each include the base electrode 71 and the plating layer 72 that covers the base electrode 71, have a height T2 greater than the crotch height T24 on the end surfaces 12*b* and 13*b*. The height T2 of the terminal electrodes 61 to 64 on the end surfaces 12*b* and 13*b* is the height from the bottom surfaces of the terminal electrodes 61 to 64 to the highest portions of the terminal electrodes 61 to 64. Accordingly, when the coil component 1 is mounted, solder that adheres to the terminal electrodes 61 to 64 on the end surfaces 12*b* and 13*b* forms fillets having a greater height compared to when the coil component according to the comparative example is mounted. In other words, the coil component 1 according to the present embodiment enables formation of fillets that are more easily recognizable than those on other coil components having crotch portions of the same height. Thus, recognition of the fillets by an appearance inspection apparatus is facilitated.

The coil component 1 according to the present embodiment is formed such that the height T3 of the inner-surface base electrode portion 71*a* is greater than the crotch height T24. More specifically, in the step of forming the base electrode, the drum-shaped core 10 is moved back and forth in the length direction of the drum-shaped core 10 so that the height T3 of the portion of the base electrode 71 (inner-surface base electrode portion 71*a*) on each of the inner surfaces 12*a* and 13*a* of the drum-shaped core 10 is greater than the crotch height T24. Accordingly, the terminal electrodes 61 to 64, which each include the base electrode 71 and the plating layer 72 that covers the base electrode 71, have a height T4 greater than the crotch height T24.

Thus, when the coil component 1 is mounted, solder that adheres to the terminal electrodes 61 to 64 on the inner surfaces 12*a* and 13*a* of the drum-shaped core 10 of the coil component 1 form fillets with a large height. Thus, the solder fillets formed on the end surface 12*b* and the inner surface 12*a* of the first flange portion 12 have a greater height than those formed on the coil component according to the comparative example. Similarly, the solder fillets formed on the end surface 13*b* and the inner surface 13*a* of the second flange portion 13 have a greater height than those formed on the coil component according to the comparative example. Therefore, thermal shock resistance is increased.

In the steps of applying the conductive paste 114 to the drum-shaped core 10 (first to fifth steps), the drum-shaped core 10 is not moved in the width direction Wd of the drum-shaped core 10. Therefore, the coil component 1 according to the present embodiment is formed such that the height T6 of the inside-surface base electrode portion 71*f* on the first inside surface 22*f* illustrated in FIG. 10 is substantially equal to the height of the inside-surface base electrode portion of the coil component according to the comparative example, and is less than the crotch height T24. Thus, the height T6 of the inside-surface base electrode portion 71*f* is less than the height of the first inside surface 22*f* of the first crotch portion 24. Accordingly, the coil component 1 is structured such that the first terminal electrode 61 and the second terminal electrode 62 are prevented from being connected to each other, and are reliably insulated from each other. In addition, the third terminal electrode 63 and the fourth terminal electrode 64 are prevented from being connected to each other, and are reliably insulated from each other.

The coil component 1 according to the present embodiment is formed such that the height T3 of the inner-surface base electrode portion 71*a* is less than the core height T11, which is the height to the bottom surface 11*a* of the core portion 11. The terminal electrodes 61 to 64 on the inner surfaces 12*a* and 13*a*, which each include the base electrode 71 (inner-surface base electrode portion 71*a*) and the plating layer 72 that covers the base electrode 71, have the height T4 less than the core height T11. The first wire 81 and the second wire 82 wound around the core portion 11 can be prevented from being connected to the terminal electrodes 61 to 64 at unintended locations.

When the bottom-surface base electrode portion 71*d*, the end-surface base electrode portion 71*b*, the side-surface base electrode portion 71*e*, the inner-surface base electrode portion 71*a*, and the inside-surface base electrode portion 71*f* are formed individually, the electrode portions need to be connected together, and the connected parts have a thickness greater than that of other parts. In contrast, according to the coil component 1 of the present embodiment, the bottom-surface base electrode portion 71*d*, the end-surface base electrode portion 71*b*, the side-surface base electrode portion 71*e*, the inner-surface base electrode portion 71*a*, and the inside-surface base electrode portion 71*f* are formed integrally with each other. Therefore, the thickness of the base electrode 71 may be reduced. In addition, since the bottom-surface base electrode portion 71*d*, the end-surface base electrode portion 71*b*, the side-surface base electrode portion 71*e*, the inner-surface base electrode portion 71*a*, and the inside-surface base electrode portion 71*f* may be formed at the same time, the number of steps is less than when the above-mentioned portions are formed individually.

The end-surface base electrode portion 71*b* has a thickness greater than that of the side-surface base electrode portion 71*e*. The base electrode 71 contains silver (Ag) and silica. Therefore, by moving the drum-shaped core 10 in the length direction Ld in the second and third steps, the thickness of the end-surface base electrode portion 71*b* can be increased, and the adhesion between the end-surface base electrode portion 71*b* and each of the end surfaces 12*b* and 13*b* of the drum-shaped core 10 can be increased accordingly.

The first leg portion 22 includes the ridge portions 41 that define the boundaries between the end surface 12*b*, the first side surface 12*e*, the inner surface 22*a*, and the first inside surface 22*f*, which are peripheral surfaces of the first leg portion 22 that face in the length direction Ld or the width direction Wd. The ridge portions 41 each have a curved surface that is convex toward the outside of the first leg portion 22. The second leg portion 23 includes the ridge portions 42 that define the boundaries between the end surface 12*b*, the second side surface 12*f*, the inner surface 22*a*, and the second inside surface 23*e*, which are peripheral surfaces of the second leg portion 23 that face in the length direction Ld or the width direction Wd. The ridge portions 42 each have a curved surface that is convex toward the outside of the second leg portion 23.

The third leg portion 32 includes the ridge portions 51 that define the boundaries between the end surface 13*b*, the first side surface 13*e*, the inner surface 32*a*, and the first inside surface 32*f*, which are peripheral surfaces of the third leg portion 32 that face in the length direction Ld or the width direction Wd. The ridge portions 51 each have a curved surface that is convex toward the outside of the third leg portion 32. The fourth leg portion 33 includes the ridge portions 52 that define the boundaries between the end surface 13*b*, the second side surface 12*f*, the inner surface 33*a*, and the second inside surface 33*e*, which are peripheral surfaces of the fourth leg portion 33 that face in the length direction Ld or the width direction Wd. The ridge portions 52 each have a curved surface that is convex toward the outside of the fourth leg portion 33.

Therefore, when the drum-shaped core 10 is moved back and forth, the ridge portions 41, 42, 51, and 52 allow the conductive paste 114 to flow smoothly so that variations in the shape of the base electrode 71 can be reduced. Accordingly, variations in the quality of the coil component 1 can be reduced.

The first flange portion 12 includes the first leg portion 22 and the second leg portion 23.

The first leg portion 22 includes the rounded ridge portions 43 that define the boundaries between the first bottom surface 22*d* and each of the end surface 12*b*, the first side surface 12*e*, the inner surface 12*a*, and the first inside surface 22*f*. The ridge portions 43 each have a curved surface that is convex toward the outside of the first leg portion 22. When the coil component 1 is mounted, solder flows into the spaces between the mounting board and the rounded ridge portions 43, so that thermal shock resistance can be increased.

The second leg portion 23 includes the rounded ridge portions 44 that define the boundaries between the second bottom surface 23*d* and each of the end surface 12*b*, the second side surface 12*f*, the inner surface 12*a*, and the second inside surface 23*e*. The ridge portions 44 each have a curved surface that is convex toward the outside of the second leg portion 23. When the coil component 1 is mounted, solder flows into the spaces between the mounting board and the rounded ridge portions 44, so that thermal shock resistance can be increased.

The second flange portion 13 includes the third leg portion 32 and the fourth leg portion 33.

The third leg portion 32 includes the rounded ridge portions 53 that define the boundaries between the third bottom surface 32*d* and each of the end surface 13*b*, the first side surface 13*e*, the inner surface 13*a*, and the first inside surface 32*f*. The ridge portions 53 each have a curved surface that is convex toward the outside of the third leg portion 32. When the coil component 1 is mounted, solder flows into the spaces between the mounting board and the rounded ridge portions 53, so that thermal shock resistance can be increased.

The fourth leg portion 33 includes the rounded ridge portions 54 that define the boundaries between the fourth bottom surface 33*d* and each of the end surface 13*b*, the second side surface 13*f*, the inner surface 13*a*, and the second inside surface 33*e*. The ridge portions 54 each have a curved surface that is convex toward the outside of the fourth leg portion 33. When the coil component 1 is mounted, solder flows into the spaces between the mounting board and the rounded ridge portions 54, so that thermal shock resistance can be increased.

As described above, the present embodiment has the following effects.

(1) The coil component 1 includes the drum-shaped core 10, the first terminal electrode 61, and the second terminal electrode 62. The drum-shaped core 10 includes the core portion 11 that extends in the length direction Ld of the coil component 1 and the first flange portion 12 provided on the first end portion of the core portion 11 in the length direction Ld. The first terminal electrode 61 and the second terminal electrode 62 are provided on the first flange portion 12. The first terminal electrode 61 and the second terminal electrode 62 each include the base electrode 71 formed on the surface of the first flange portion 12 and the plating layer 72 that covers the base electrode 71. The base electrode 71 includes the bottom-surface base electrode portion 71*d* formed on the first bottom surface 22*d*, the end-surface base electrode portion 71*b* formed on the end surface 12*b*, and the side-surface base electrode portion 71*e* formed on the first side surface 12*e*. The height T1 of the end-surface base electrode portion 71*b* is greater than the height T24 of the first crotch portion 24, and the height T5 of the side-surface base electrode portion 71*e* is less than the height T24 of the first crotch portion 24.

The coil component 1 according to the present embodiment is formed such that the terminal electrodes 61 to 64, which each include the base electrode 71 and the plating layer 72 that covers the base electrode 71, have the height T2 greater than the crotch height T24 on the end surfaces 12*b* and 13*b*. The height T2 of the terminal electrodes 61 to 64 on the end surfaces 12*b* and 13*b* is the height from the bottom surfaces of the terminal electrodes 61 to 64 to the highest portions of the terminal electrodes 61 to 64. Accordingly, when the coil component 1 is mounted, solder that adheres to the terminal electrodes 61 to 64 on the end surfaces 12*b* and 13*b* forms fillets having a greater height compared to when the coil component according to the comparative example is mounted. In other words, the fillets are more easily recognizable than those on other coil components having crotch portions of the same height. Thus, recognition of the fillets by an appearance inspection apparatus is facilitated.

(2) The coil component 1 according to the present embodiment is formed such that the height T3 of the inner-surface base electrode portion 71*a* is greater than the crotch height T24. The height T4 of the terminal electrodes 61 to 64, which each include the base electrode 71 and the plating layer 72 that covers the base electrode 71, is greater than the crotch height T24. Thus, when the coil component 1 is mounted, solder that adheres to the terminal electrodes 61 to 64 on the inner surfaces 12*a* and 13*a* of the drum-shaped core 10 of the coil component 1 form fillets with a large height. Thus, the solder fillets formed on the end surface 12*b* and the inner surface 12*a* of the first flange portion 12 have a greater height than those formed on the coil component according to the comparative example. Similarly, the solder fillets formed on the end surface 13*b* and the inner surface 13*a* of the second flange portion 13 have a greater height than those formed on the coil component according to the comparative example. Therefore, thermal shock resistance is increased.

(3) In the step of forming the base electrode 71, the height T1 of the portion of the base electrode 71 (end-surface base electrode portion 71*b*) on each of the end surfaces 12*b* and 13*b* of the drum-shaped core 10 can be easily increased to a height greater than the crotch height T24 by moving the drum-shaped core 10 back and forth in the length direction of the drum-shaped core 10.

(4) In the step of forming the base electrode 71, the height T3 of the portion of the base electrode 71 (inner-surface base electrode portion 71*a*) on each of the inner surfaces 12*a* and 13*a* of the drum-shaped core 10 can be easily increased to a height greater than the crotch height T24 by moving the drum-shaped core 10 back and forth in the length direction of the drum-shaped core 10.

(5) In the steps of applying the conductive paste 114 to the drum-shaped core 10 (first to fifth steps), the drum-shaped core 10 is not moved in the width direction Wd of the drum-shaped core 10. Therefore, the coil component 1 according to the present embodiment is formed such that the height T6 of the inside-surface base electrode portion 71*f* on the first inside surface 22*f* illustrated in FIG. 10 is substantially equal to the height of the inside-surface base electrode portion of the coil component according to the comparative example, and is less than the crotch height T24. Thus, the height T6 of the inside-surface base electrode portion 71*f* is less than the height of the first inside surface 22*f* of the first crotch portion 24. Accordingly, the coil component 1 is structured such that the first terminal electrode 61 and the second terminal electrode 62 are prevented from being connected to each other, and are reliably insulated from each other. In addition, the third terminal electrode 63 and the fourth terminal electrode 64 are prevented from being connected to each other, and are reliably insulated from each other.

(6) The coil component 1 according to the present embodiment is formed such that the height T3 of the inner-surface base electrode portion 71*a* is less than the core height T11, which is the height to the bottom surface 11*a* of the core portion 11. The terminal electrodes 61 to 64 on the inner surfaces 12*a* and 13*a*, which each include the base electrode 71 (inner-surface base electrode portion 71*a*) and the plating layer 72 that covers the base electrode 71, have the height T4 less than the core height T11. The first wire 81 and the second wire 82 wound around the core portion 11 can be prevented from being connected to the terminal electrodes 61 to 64 at unintended locations.

(7) When the bottom-surface base electrode portion 71*d*, the end-surface base electrode portion 71*b*, the side-surface base electrode portion 71*e*, the inner-surface base electrode portion 71*a*, and the inside-surface base electrode portion 71*f* are formed individually, the electrode portions need to be connected together, and the connected parts have a thickness greater than that of other parts. In contrast, according to the coil component 1 of the present embodiment, the bottom-surface base electrode portion 71*d*, the end-surface base electrode portion 71*b*, the side-surface base electrode portion 71*e*, the inner-surface base electrode portion 71*a*, and the inside-surface base electrode portion 71*f* are formed integrally with each other. Therefore, the thickness of the base electrode 71 may be reduced. In addition, since the bottom-surface base electrode portion 71*d*, the end-surface base electrode portion 71*b*, the side-surface base electrode portion 71*e*, the inner-surface base electrode portion 71*a*, and the inside-surface base electrode portion 71*f* may be formed at the same time, the number of steps is less than when the above-mentioned portions are formed individually.

(8) The end-surface base electrode portion 71*b* has a thickness greater than that of the side-surface base electrode portion 71*e*. The base electrode 71 contains silver (Ag) and silica. Therefore, the adhesion between the end-surface base electrode portion 71*b* and each of the end surfaces 12*b* and 13*b* of the drum-shaped core 10 can be increased by increasing the thickness of the end-surface base electrode portion 71*b*.

(9) The first leg portion 22 includes the ridge portions 41 that define the boundaries between the end surface 12*b*, the first side surface 12*e*, the inner surface 22*a*, and the first inside surface 22*f*, which are peripheral surfaces of the first leg portion 22 that face in the length direction Ld or the width direction Wd. The ridge portions 41 each have a curved surface that is convex toward the outside of the first leg portion 22. The second leg portion 23 includes the ridge portions 42 that define the boundaries between the end surface 12*b*, the second side surface 12*f*, the inner surface 22*a*, and the second inside surface 23*e*, which are peripheral surfaces of the second leg portion 23 that face in the length direction Ld or the width direction Wd. The ridge portions 42 each have a curved surface that is convex toward the outside of the second leg portion 23.

The third leg portion 32 includes the ridge portions 51 that define the boundaries between the end surface 13*b*, the first side surface 13*e*, the inner surface 32*a*, and the first inside surface 32*f*, which are peripheral surfaces of the third leg portion 32 that face in the length direction Ld or the width direction Wd. The ridge portions 51 each have a curved surface that is convex toward the outside of the third leg portion 32. The fourth leg portion 33 includes the ridge portions 52 that define the boundaries between the end surface 13*b*, the second side surface 12*f*, the inner surface 33*a*, and the second inside surface 33*e*, which are peripheral surfaces of the fourth leg portion 33 that face in the length direction Ld or the width direction Wd. The ridge portions 52 each have a curved surface that is convex toward the outside of the fourth leg portion 33.

Therefore, when the drum-shaped core 10 is moved back and forth, the ridge portions 41, 42, 51, and 52 allow the conductive paste 114 to flow smoothly so that variations in the shape of the base electrode 71 can be reduced. Accordingly, variations in the quality of the coil component 1 can be reduced.

(10) The first leg portion 22 includes the rounded ridge portions 43 that define the boundaries between the first bottom surface 22*d* and each of the end surface 12*b*, the first side surface 12*e*, the inner surface 12*a*, and the first inside surface 22*f*. The ridge portions 43 each have a curved surface that is convex toward the outside of the first leg portion 22. When the coil component 1 is mounted, solder flows into the spaces between the mounting board and the rounded ridge portions 43, so that thermal shock resistance can be increased.

(11) The second leg portion 23 includes the rounded ridge portions 44 that define the boundaries between the second bottom surface 23*d* and each of the end surface 12*b*, the second side surface 12*f*, the inner surface 12*a*, and the second inside surface 23*e*. The ridge portions 44 each have a curved surface that is convex toward the outside of the second leg portion 23. When the coil component 1 is mounted, solder flows into the spaces between the mounting board and the rounded ridge portions 44, so that thermal shock resistance can be increased.

(12) The third leg portion 32 includes the rounded ridge portions 53 that define the boundaries between the third bottom surface 32*d* and each of the end surface 13*b*, the first side surface 13*e*, the inner surface 13*a*, and the first inside surface 32*f*. The ridge portions 53 each have a curved surface that is convex toward the outside of the third leg portion 32. When the coil component 1 is mounted, solder flows into the spaces between the mounting board and the rounded ridge portions 53, so that thermal shock resistance can be increased.

(13) The fourth leg portion 33 includes the rounded ridge portions 54 that define the boundaries between the fourth bottom surface 33*d* and each of the end surface 13*b*, the second side surface 13*f*, the inner surface 13*a*, and the second inside surface 33*e*. The ridge portions 54 each have a curved surface that is convex toward the outside of the fourth leg portion 33. When the coil component 1 is mounted, solder flows into the spaces between the mounting board and the rounded ridge portions 54, so that thermal shock resistance can be increased.

Modifications

The above-described embodiment may be modified as described below. The above-described embodiment and the modifications described below may be applied in combination with each other as long as there is no technical contradiction.

Figure 19:
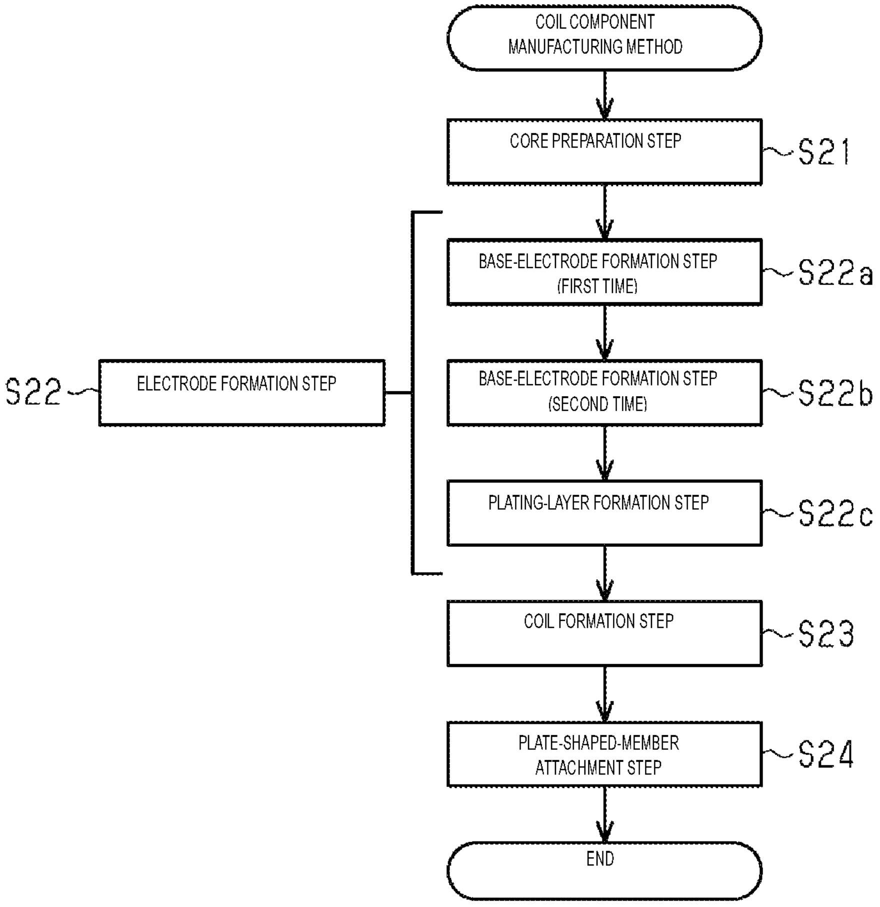
FIG. 19 is a flowchart of a method for manufacturing a coil component according to a modification.

FIG. 19 illustrates a modification of a method for manufacturing the coil component 1. The coil component 1 is manufactured by steps S21 to S24 illustrated in FIG. 19.

In the manufacturing method according to the modification, step S21 is the same as step S11 according to the above-described embodiment.

Step S22, which is an electrode formation step, includes a first base-electrode formation step (step S22*a*), a second base-electrode formation step (step S22*b*), and a plating-layer formation step (step S22*c*). The first base-electrode formation step (step S22*a*) is the same as step S12*a* according to the above-described embodiment. In other words, the first base-electrode formation step includes the above-described first to fifth steps in the above-described embodiment.

In the second base-electrode formation step (step S22*b*), which is performed subsequent to the fifth step, the drum-shaped core 10 is dip-coated with the conductive paste 114 (sixth step). Then, the holding device 111 is moved upward to move the drum-shaped core 10 held by the holding device 111 upward away from the conductive paste 114 (seventh step). As a result of the second base-electrode formation step, the bottom-surface base electrode portion 71*d* on each of the first bottom surface 22*d*, the second bottom surface 23*d*, the third bottom surface 32*d*, and the fourth bottom surface 33*d* may be formed to have smooth surfaces.

The plating-layer formation step (step S22*c*) is the same as step S12*b* in the above-described embodiment. Steps S23 and S24 are the same as steps S13 and S14 in the above-described embodiment.

The coil component 1 in which the bottom-surface base electrode portion 71*d* has a smooth surface is formed by the above-described steps.

In the above-described embodiment, the coil component may include three or more wires.

In the above-described embodiment, the main-portion inner surface 21*a* of the first main portion 21 of the first flange portion 12 may be on the same plane as the inner surfaces 22*a* and 23*a* of the first leg portion 22 and the second leg portion 23. In addition, the main-portion inner surface 31*a* of the second main portion 31 of the second flange portion 13 may be on the same plane as the inner surfaces 32*a* and 33*a* of the third leg portion 32 and the fourth leg portion 33.

While preferred embodiments of the disclosure have been described above, it is to be understood that variations and modifications will be apparent to those skilled in the art without departing from the scope and spirit of the disclosure. The scope of the disclosure, therefore, is to be determined solely by the following claims.

What is claimed is:

1. A coil component comprising:

a drum-shaped core including a core portion that extends in a length direction of the coil component and a first flange portion provided on a first end portion of the core portion in the length direction;

a first wire and a second wire which each have a first end and a second end, the first wire and the second wire being wound around the core portion;

a first terminal electrode that is provided on the first flange portion and to which the first end of the first wire is connected; and a second terminal electrode that is provided on the first flange portion and to which the first end of the second wire is connected, wherein the first flange portion includes an inner surface that faces toward the core portion, an end surface that faces away from the inner surface, a bottom surface and a top surface that face away from each other in a height direction that is orthogonal to the length direction, a pair of side surfaces that face away from each other in a width direction that is orthogonal to the length direction and the height direction, a first main portion provided on the first end portion of the core portion, a first leg portion and a second leg portion that project from the first main portion in the height direction, and a main-portion bottom surface of the first main portion that faces toward the bottom surface, and a pair of inside surfaces of the first leg portion and the second leg portion that face each other, wherein the first main portion, the first leg portion, and the second leg portion surround and define a first crotch portion when viewed from the end surface, and the bottom surface includes a first bottom surface of the first leg portion and a second bottom surface of the second leg portion, the first terminal electrode and the second terminal electrode each include a base electrode on a surface of the first flange portion and a plating layer that covers the base electrode, the base electrode includes a bottom-surface base electrode portion on the bottom surface, an end-surface base electrode portion on the end surface, and a side-surface base electrode portion on each of the side surfaces, the end-surface base electrode portion has a height greater than a height of the first crotch portion, and heights of the side-surface base electrode portion at both edges of the side-surface base electrode portion are less than the height of the first crotch portion.

2. The coil component according to claim 1, wherein the base electrode further includes an inner-surface base electrode portion on the inner surface, and the height of the end-surface base electrode portion is equal to a height of the inner-surface base electrode portion.

3. The coil component according to claim 2, wherein the height of the inner-surface base electrode portion is greater than the height of the first crotch portion and less than a height of a lower surface of the core portion.

4. The coil component according to claim 3, wherein the base electrode includes an inside-surface base electrode portion on each of the inside surfaces, and the inside-surface base electrode portion has a height less than a height of the inside surfaces.

5. The coil component according to claim 1, wherein the bottom-surface base electrode portion, the end-surface base electrode portion, and the side-surface base electrode portion are continuous with each other.

6. The coil component according to claim 1, wherein the end-surface base electrode portion is thicker than the side-surface base electrode portion.

7. The coil component according to claim 1, wherein the drum-shaped core includes rounded ridge portions, each of which defines a boundary between adjacent ones of the bottom surface, the end surface, the inner surface, the side surfaces, and the inside surfaces.

8. The coil component according to claim 2, wherein the bottom-surface base electrode portion, the end-surface base electrode portion, and the side-surface base electrode portion are continuous with each other.

9. The coil component according to claim 3, wherein the bottom-surface base electrode portion, the end-surface base electrode portion, and the side-surface base electrode portion are continuous with each other.

10. The coil component according to claim 4, wherein the bottom-surface base electrode portion, the end-surface base electrode portion, and the side-surface base electrode portion are continuous with each other.

11. The coil component according to claim 2, wherein the end-surface base electrode portion is thicker than the side-surface base electrode portion.

12. The coil component according to claim 3, wherein the end-surface base electrode portion is thicker than the side-surface base electrode portion.

13. The coil component according to claim 4, wherein the end-surface base electrode portion is thicker than the side-surface base electrode portion.

14. The coil component according to claim 5, wherein the end-surface base electrode portion is thicker than the side-surface base electrode portion.

15. The coil component according to claim 2, wherein the drum-shaped core includes rounded ridge portions, each of which defines a boundary between adjacent ones of the bottom surface, the end surface, the inner surface, the side surfaces, and the inside surfaces.

16. The coil component according to claim 3, wherein the drum-shaped core includes rounded ridge portions, each of which defines a boundary between adjacent ones of the bottom surface, the end surface, the inner surface, the side surfaces, and the inside surfaces.

17. The coil component according to claim 4, wherein the drum-shaped core includes rounded ridge portions, each of which defines a boundary between adjacent ones of the bottom surface, the end surface, the inner surface, the side surfaces, and the inside surfaces.

18. The coil component according to claim 5, wherein the drum-shaped core includes rounded ridge portions, each of which defines a boundary between adjacent ones of the bottom surface, the end surface, the inner surface, the side surfaces, and the inside surfaces.

19. A coil component comprising:

a drum-shaped core including a core portion that extends in a length direction of the coil component and a first flange portion provided on a first end portion of the core portion in the length direction;

a first wire and a second wire which each have a first end and a second end, the first wire and the second wire being wound around the core portion;

a first terminal electrode that is provided on the first flange portion and to which the first end of the first wire is connected; and a second terminal electrode that is provided on the first flange portion and to which the first end of the second wire is connected, wherein:

the first flange portion includes:

an inner surface that faces toward the core portion, an end surface that faces away from the inner surface, a bottom surface and a top surface that face away from each other in a height direction that is orthogonal to the length direction, a pair of side surfaces that face away from each other in a width direction that is orthogonal to the length direction and the height direction, a first main portion provided on the first end portion of the core portion, a first leg portion and a second leg portion that project from the first main portion in the height direction, and a main-portion bottom surface of the first main portion that faces toward the bottom surface, and a pair of inside surfaces of the first leg portion and the second leg portion that face each other, wherein the first main portion, the first leg portion, and the second leg portion surround and define a first crotch portion when viewed from the end surface, and the bottom surface includes a first bottom surface of the first leg portion and a second bottom surface of the second leg portion, the first terminal electrode and the second terminal electrode each include a base electrode on a surface of the first flange portion and a plating layer that covers the base electrode, the base electrode includes a bottom-surface base electrode portion on the bottom surface, an end-surface base electrode portion on the end surface, and a side-surface base electrode portion on each of the side surfaces, the end-surface base electrode portion has a height greater than a height of the first crotch portion, the side-surface base electrode portion has a height less than the height of the first crotch portion, the base electrode further includes an inner-surface base electrode portion on the inner surface, the height of the end-surface base electrode portion is equal to a height of the inner-surface base electrode portion, the height of the inner-surface base electrode portion is greater than the height of the first crotch portion and less than a height of a lower surface of the core portion, the base electrode includes an inside-surface base electrode portion on each of the inside surfaces, and the inside-surface base electrode portion has a height less than a height of the inside surfaces.

20. The coil component according to claim 19, wherein the bottom-surface base electrode portion, the end-surface base electrode portion, and the side-surface base electrode portion are continuous with each other.

21. The coil component according to claim 19, wherein the end-surface base electrode portion is thicker than the side-surface base electrode portion.

22. The coil component according to claim 19, wherein the drum-shaped core includes rounded ridge portions, each of which defines a boundary between adjacent ones of the bottom surface, the end surface, the inner surface, the side surfaces, and the inside surfaces.

* * * * *